United States Patent
Busby

(10) Patent No.: US 11,409,978 B2
(45) Date of Patent: Aug. 9, 2022

(54) MACHINE-READABLE OPTICAL LABEL INCLUDING SPECTRALLY ENCODED DATA STORAGE PATTERNS

(71) Applicant: CORNING RESEARCH & DEVELOPMENT CORPORATION, Corning, NY (US)

(72) Inventor: Erik Michael Allan Busby, Castro Valley, CA (US)

(73) Assignee: Corning Research & Development Corporation, Corning, NY (US)

( * ) Notice: Subject to any disclaimer, the term of this patent is extended or adjusted under 35 U.S.C. 154(b) by 42 days.

(21) Appl. No.: 17/090,480

(22) Filed: Nov. 5, 2020

(65) Prior Publication Data

US 2022/0138446 A1    May 5, 2022

(51) Int. Cl.
| | | |
|---|---|---|
| *G06K 19/06* | (2006.01) | |
| *G06K 9/18* | (2006.01) | |
| *G06K 7/14* | (2006.01) | |

(52) U.S. Cl.
CPC ......... *G06K 7/1417* (2013.01); *G06K 7/1413* (2013.01); *G06K 19/06028* (2013.01); *G06K 19/06037* (2013.01)

(58) Field of Classification Search
CPC ..... G02B 1/10; G02B 1/11; Y10T 428/24901; H01C 1/04; H01C 7/006; G06K 7/1413; G06K 19/06037
USPC ..................... 235/494, 491, 462.1
See application file for complete search history.

(56) References Cited

U.S. PATENT DOCUMENTS

| | | |
|---|---|---|
| 8,028,914 B2 | 10/2011 | Sakuma et al. |
| 9,639,725 B1 | 5/2017 | Maricic et al. |
| 2004/0071359 A1* | 4/2004 | Sharma ............... H04N 1/4446 382/254 |

(Continued)

FOREIGN PATENT DOCUMENTS

| | | |
|---|---|---|
| CA | 2351678 A1 | 12/2002 |
| JP | 2009-020813 A | 1/2009 |

OTHER PUBLICATIONS

FLEXcon, "Reflective Long Range Barcode and Durable Labeling", Available Online at <https://www.flexcon.com/products/spotlight/durables/reflectamark-pm-400>, retrieved in 2020, 4 pages.

(Continued)

*Primary Examiner* — Daniel St Cyr
(74) *Attorney, Agent, or Firm* — Grant A. Gildehaus

(57) ABSTRACT

Methods, systems, and computer program products for storing data in, and reading data from, machine-readable optical labels are disclosed. A machine-readable optical label includes a data storage layer and a substrate having a reflective surface. The data storage layer defines a plurality of data storage patterns in each of a corresponding number of absorption bands. Each of the data storage patterns encodes a portion of the data stored in the label as a reflectivity of the label in the absorption band of the data storage pattern. The label is read by capturing images of the label in each of a plurality of color channels, with each color channel including one absorption band and excluding the other absorption bands. The data stored by each data storage pattern is then decoded from the image in the corresponding color channel.

16 Claims, 14 Drawing Sheets

(56) References Cited

U.S. PATENT DOCUMENTS

2008/0090726 A1\* 4/2008 Eskra .................... B41M 5/385
                                                      503/207
2011/0042462 A1   2/2011 Smith
2019/0182951 A1\* 6/2019 Ellinger ................. H01C 1/04

OTHER PUBLICATIONS

Paradiso, "High Capacity Color Barcodes (HCCB)", Available Online at <https://www.microsoft.com/en-us/research/project/high-capacity-color-barcodes-hccb/?from=http%3A%2F%2Fresearch.microsoft.com%2Fen-us%2Fprojects%2Fhccb%2Fabout.aspx>, Dec. 18, 2007, 3 pages.

ROSISTEM Barcode(First barcoding website from Romania!), "Introduction", Available Online at <https://web.archive.org/web/20191226125351/https://www.barcode.ro/tutorials/barcodes/ultracode.html>, Retrieved on Dec. 26, 2019, 1 page.

\* cited by examiner

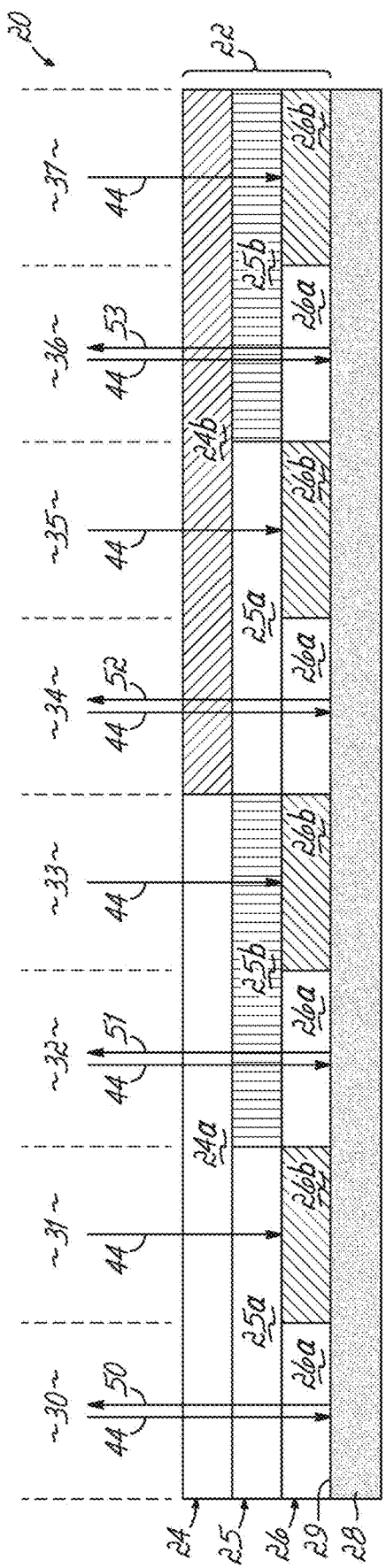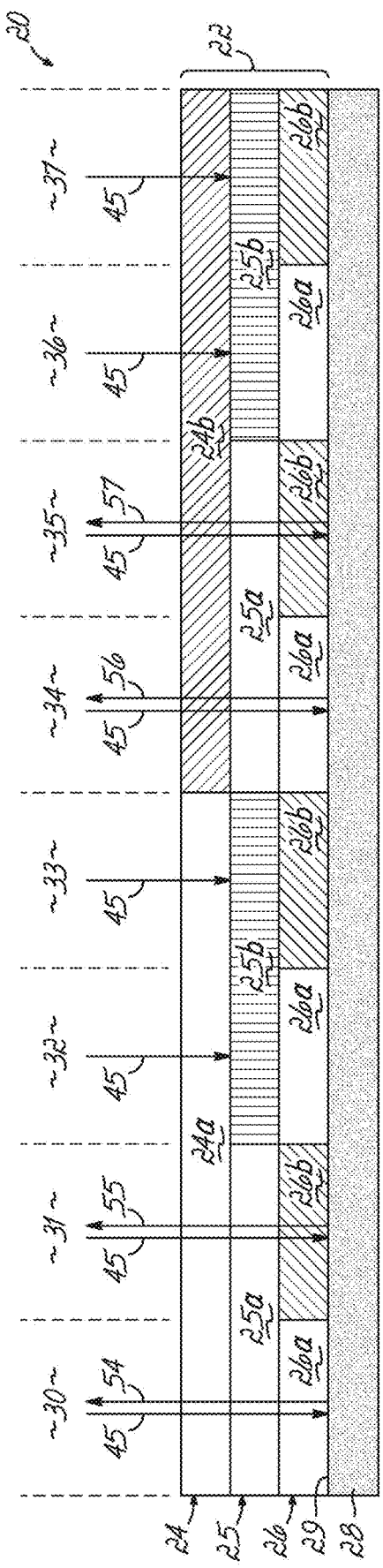

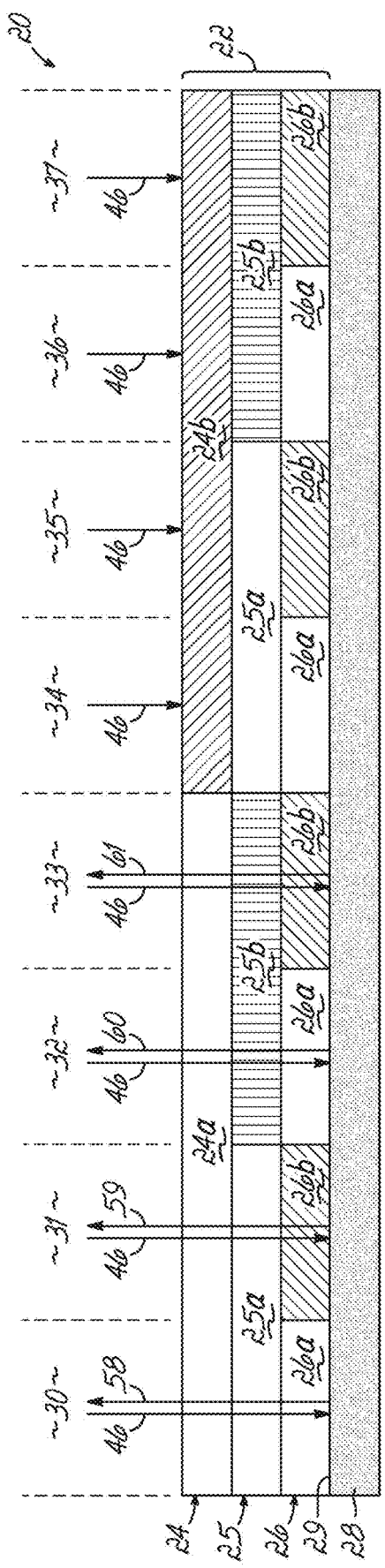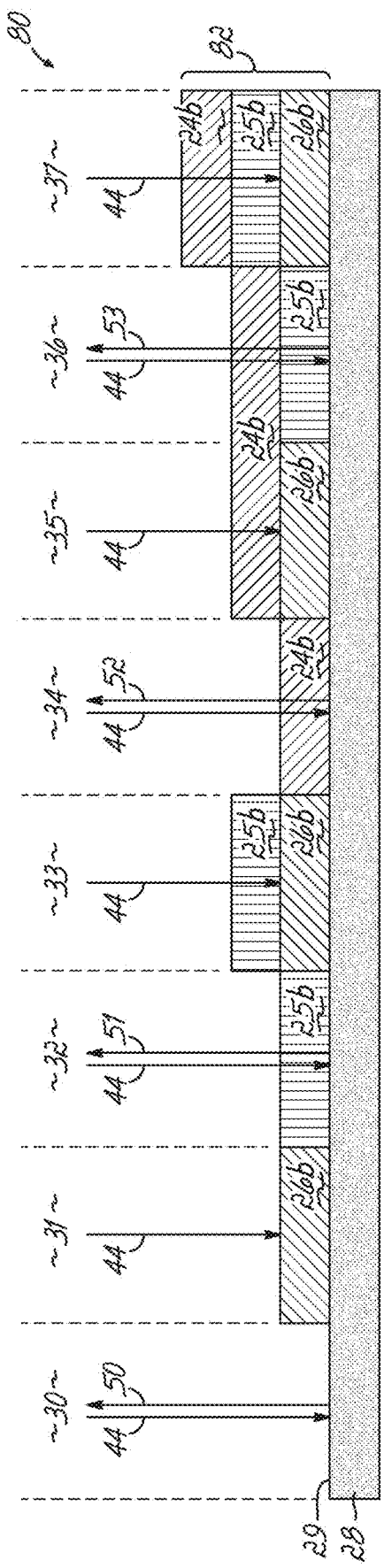
FIG. 4
FIG. 5

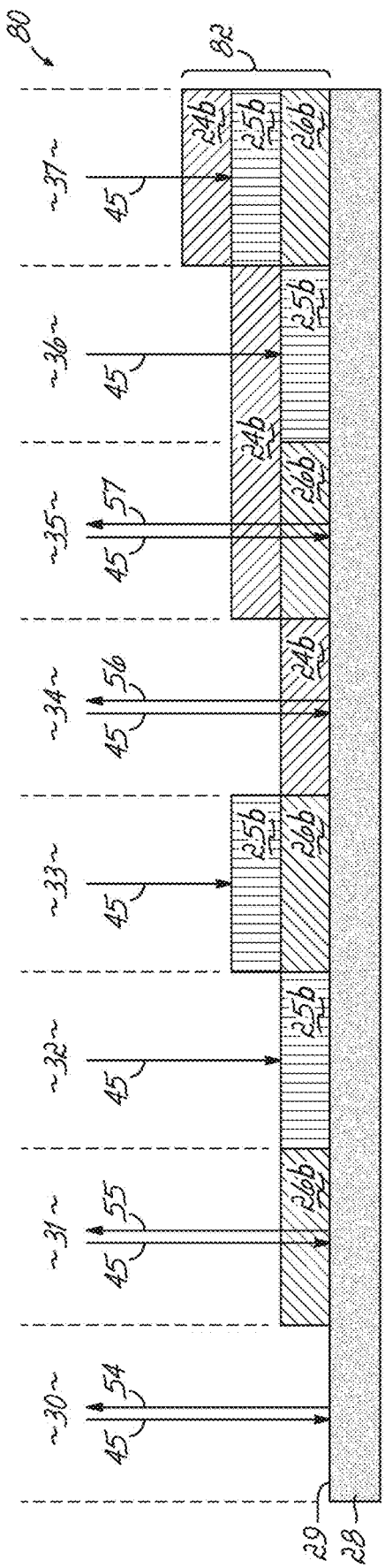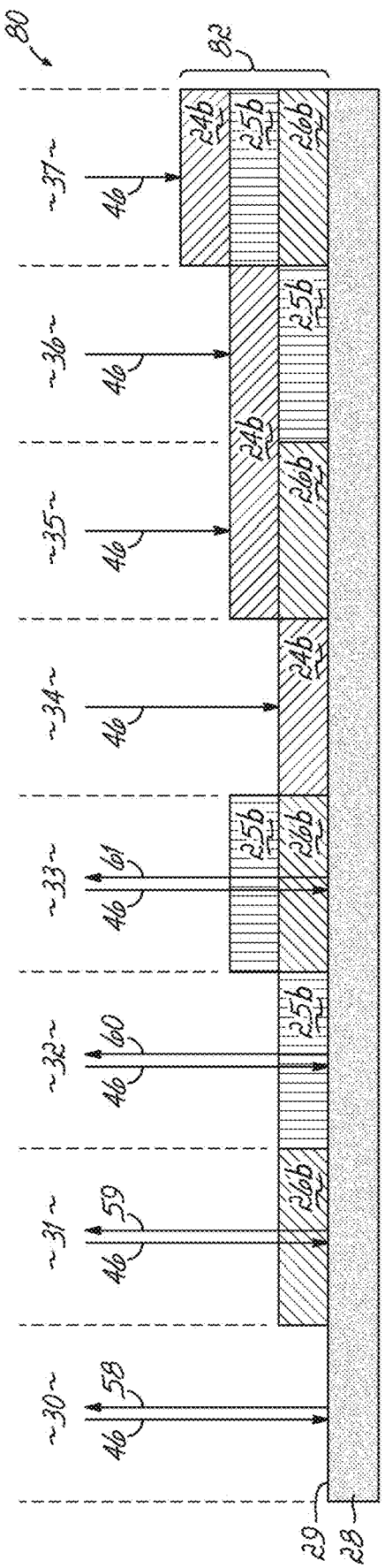

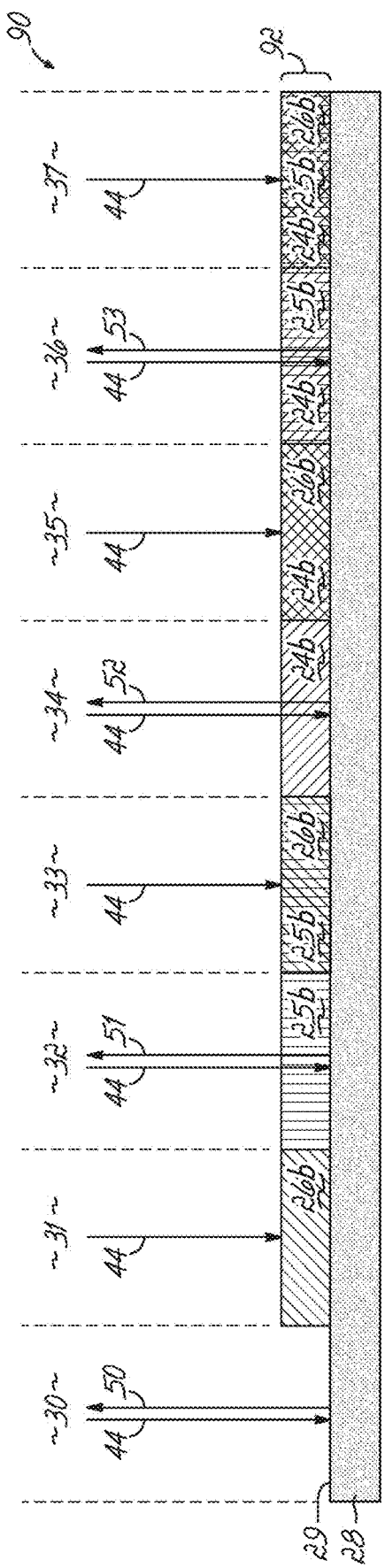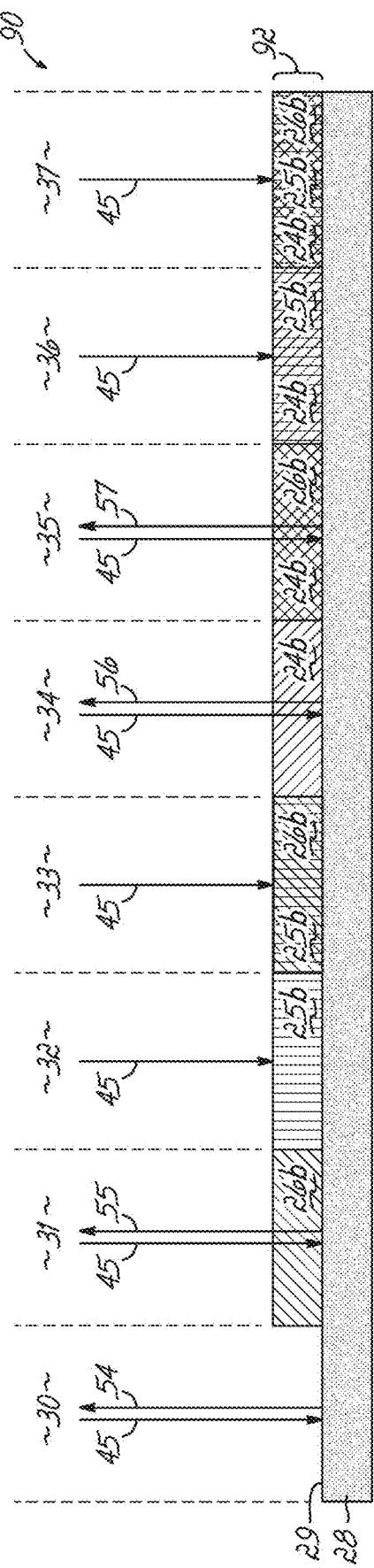

MACHINE-READABLE OPTICAL LABEL INCLUDING SPECTRALLY ENCODED DATA STORAGE PATTERNS

TECHNICAL FIELD

This disclosure relates generally to machine-readable optical labels, as well as systems and methods for encoding data in, and retrieving data from, machine-readable optical labels.

BACKGROUND

Machine-readable optical labels, often referred to as "barcodes" encode data in a visual, machine-readable form. FIGS. 1A and 1B depict two exemplary barcodes, commonly referred to as a Universal Product Code (UPC) 10 and a quick-read (QR) code 12. The UPC code 10 is a type of one-dimensional barcode, and the QR code 12 is type of two-dimensional barcode. One and two-dimensional barcodes can be printed at various densities to accommodate the printing and scanning capabilities of the equipment used to make and read the labels. The smallest element from which a barcode code is formed is commonly referred to as a module.

By way of example, each line 14 and space 15 comprising the UPC code 10 is an integral number of modules wide. In the case of the QR code 12, each square pixel 16 corresponds to a module. Barcodes may also include human-readable data, such as the numerals 18 included in the UPC code 10. Bar codes also typically include some sort of fiducial markers, such as the positioning symbols 19 located at three of the four corners of the QR code 12. Fiducial markers may be used by devices reading the codes to determine the orientation and scale of the code.

Barcodes encode data using various arrangements of black and white modules, with unique combinations of one or more modules forming symbols each representing one or more bits of data. For example, the Universal Product Code (UPC) includes 12 digits, and encodes each digit as a symbol comprising two bars and two spaces each comprising an integral number of modules, e.g., from 1 to 4 modules. UPC barcodes consist of (3×2)+(12×2)=30 bars, of which 6 represent guard patterns and 24 represent numerical digits.

Barcodes may be scanned by optical scanners, commonly referred to as barcode readers, or by capturing an image of the code (e.g., using a smartphone) and decoding the data based on the image. Barcodes are ubiquitous in industrial and consumer settings. Generally speaking, conventional barcodes work reasonably well for storage of small amounts of data, e.g., bytes or kilobytes. This amount of data is sufficient for applications such as UPC codes, part numbers, and product serial numbers. However, the applications of barcodes are often limited by the limited amount of data that can be encoded into the barcode.

For example, a standard Version 4 (33×33) two-dimensional barcode can only store about 4,300 alphanumeric characters. Barcodes have been proposed that use expanded color palettes to increase data density. However, the maximum number of colors that can be used is limited by both the ability of printers to accurately print colors, as well as the ability of imaging devices to reliably distinguish between the colors. Moreover, because the number of colors must double in order to increase the information capacity of a module by one bit, expanding the color palate from two (e.g., black and white) to eight (e.g., black, blue, green, cyan, red, magenta, yellow, and white) only expands the data capacity of each module from one bit to three bits.

Conventional barcodes have other limitations in addition to the amount of data they can store. One such limitation is that known barcodes require reasonably high imaging quality to be decoded. This requirement puts practical limits on the ambient conditions and distances at which the barcode can be read. In addition, readers typically require an unobscured view of the entire barcode in order to read the barcode.

Thus, there is a need for improved machine-readable optical labels, as well as methods of encoding data in, and reading data from machine-readable optical labels.

SUMMARY

In an embodiment of the disclosure, a system for storing data is provided. The system includes a label having a substrate with a reflective surface, and a data storage layer operatively coupled to the reflective surface of the substrate. As used herein, "reflective surface" refers to a surface that may produce specular reflection, diffuse reflection (scattering), retroreflection, or a combination of two or more of these types of reflection. Further, "operatively coupled" refers to elements being directly or indirectly coupled, or otherwise arranged relative to each other, in a manner such that the elements are configured to operate together (i.e., cooperate). By definition, the operation of the reflective surface relates to reflecting light. The data storage layer is also configured to operate in a manner with respect to light. In particular, the data storage layer defines a first pattern having a first absorption band and a second pattern having a second absorption band. The first pattern encodes a first portion of the data, the second pattern encodes a second portion of the data, and the first absorption band is spectrally distinguishable from the second absorption band.

In an aspect of the disclosure, the first pattern and the second pattern each comprise a plurality of modules, the first portion of the data is encoded as an attenuation level of reflected light reflected by each module in the first absorption band, and the second portion of the data is encoded as the attenuation level of the reflected light reflected by each module in the second absorption band.

In another aspect of the disclosure, each pattern is configured so that the attenuation level of the reflected light reflected by each module in each absorption band is one of a plurality of discrete attenuation levels.

In another aspect of the disclosure, the reflective surface of the substrate is a retroreflective surface.

In another aspect of the disclosure, the system includes a reader having a light source configured to provide incident light to the label, and an imaging device configured to receive reflected light from the label.

In another aspect of the disclosure, the light source is configured to emit a first light in a first emission band that falls within the first absorption band, and a second light in a second emission band that falls within the second absorption band. The reader is configured to cause the light source to emit the first light during a first period of time and the second light during a second period of time, cause the imaging device to capture a first image of the label during the first period of time and a second image of the label during the second period of time, decode the first portion of the data from the first image, and decode the second portion of the data from the second image.

In another aspect of the disclosure, the data storage layer further defines a third pattern having a third absorption band that is spectrally distinguishable from the first absorption band and the second absorption band and that encodes a third portion of the data. The light source is further configured to emit a third light in a third emission band that falls within the third absorption band, and the imaging device includes a first color channel and a second color channel. The first color channel includes the first absorption band and the second absorption band and excludes the third absorption band, the second color channel includes the third absorption band and excludes the first absorption band and the second absorption band, and the first image is captured in the first color channel. The reader is further configured to cause the light source to emit the third light and cause the imaging device to capture a third image of the label in the second color channel during the first period of time, and decode the third portion of the data from the third image.

In another aspect of the disclosure, the first color channel includes the first absorption band and excludes the second absorption band, the second color channel excludes the first absorption band and includes the second color channel, and the reader is configured to cause the imaging device to capture the first image of the label in the first color channel and the second image of the label in the second color channel, decode the first portion of the data from the first image, and decode the second portion of the data from the second image.

In another aspect of the disclosure, the first color channel is one of a red channel, a green channel, and a blue channel, and the second color channel is another of the red channel, the green channel, and the blue channel.

In another aspect of the disclosure, the data storage layer includes a first thin film having one or more first absorptive regions that absorb light in the first absorption band and define the first pattern, and a second thin film having one or more second absorptive regions that absorb light in the second absorption band and define the second pattern.

In another embodiment of the disclosure, a method of reading the data from the label is provided. The method includes capturing the first image of the label in the first color channel including the first absorption band and excluding the second absorption band, capturing the second image of the label in the second color channel excluding the first absorption band and including the second absorption band, decoding the first portion of the data from the first image, and decoding the second portion of the data from the second image.

In an aspect of the disclosure, capturing the first image in the first color channel and the second image in the second color channel includes illuminating the label with the first light having the first emission band that falls within the first absorption band during the first period of time, illuminating the label with the second light having the second emission band that falls within the second absorption band during the second period of time, capturing the first image during the first period of time, and capturing the second image during the second period of time.

In another aspect of the disclosure, the first color channel is the one of the red channel, the green channel, and the blue channel, and the second color channel is the other of the red channel, the green channel, and the blue channel.

In another aspect of the disclosure, capturing the first image in the first color channel and the second image in the second color channel includes filtering a first portion of reflected light received from the label through a first filter having a first passband that includes the first absorption band and excludes the second absorption band, filtering a second portion of the reflected light received from the label through a second filter having a second passband that excludes the first absorption band and includes the second absorption band, capturing the first image using the first portion of the reflected light filtered by the first filter, and capturing the second image using the second portion of the reflected light filtered by the second filter.

In another aspect of the disclosure, the method further includes capturing the third image of the label in a third color channel including the third absorption band and excluding the first absorption band and the second absorption band, and decoding a third portion of the data from the third image, wherein the first passband excludes the third absorption band and the second passband includes the third absorption band. In this aspect of the disclosure, capturing the first image of the label in the first color channel, the second image of the label in the second color channel, and the third image of the label in the third color channel includes illuminating the label with the first light having the first emission band that falls within the first absorption band during the first period of time, illuminating the label with the second light having the second emission band that falls within the second absorption band during the second period of time, and illuminating the label with the third light having the third emission band that falls within the third absorption band during the first period of time. The first image is captured during the first period of time, the second image is captured during the second period of time, and the third image is captured using the second portion of the reflected light filtered by the second filter during the first period of time.

In another aspect of the disclosure, the label includes the plurality of modules, and decoding the first portion of the data and the second portion of the data comprises, for each module, determining, based on the first image, a first attenuation level of reflected light reflected in the first absorption band, determining, based on the second image, a second attenuation level of reflected light in the second absorption band, assigning a first logic level to a first data bit associated with the module based on the first attenuation level, and assigning a second logic level to a second data bit associated with the module based on the second attenuation level.

In another aspect of the disclosure, the method further includes capturing an image of the label in a broadband channel including the first absorption band and the second absorption band, and performing background correction on at least one of the first image and the second image using the broadband image.

In another embodiment of the disclosure, a computer program product for reading the data from the label is provided. The computer program product includes a non-transitory computer-readable storage medium, and program code stored on the non-transitory computer-readable storage medium. When executed by one or more processors, the program code causes the one or more processors to capture the first image of the label in the first color channel including the first absorption band and excluding the second absorption band, capture the second image of the label in the second color channel excluding the first absorption band and including the second absorption band, decode the first portion of the data from the first image, and decode the second portion of the data from the second image.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 2-4 are cross-sectional views of a portion of a label depicting a plurality of modules including a data storage layer in accordance with an embodiment;

FIGS. 5-7 are cross-sectional views of a portion of another label depicting a plurality of modules including a data storage layer in accordance with another embodiment;

FIGS. 8-10 are cross-sectional views of a portion of a label depicting a plurality of modules including a data storage layer in accordance with yet another embodiment;

DETAILED DESCRIPTION

Figure 1A:
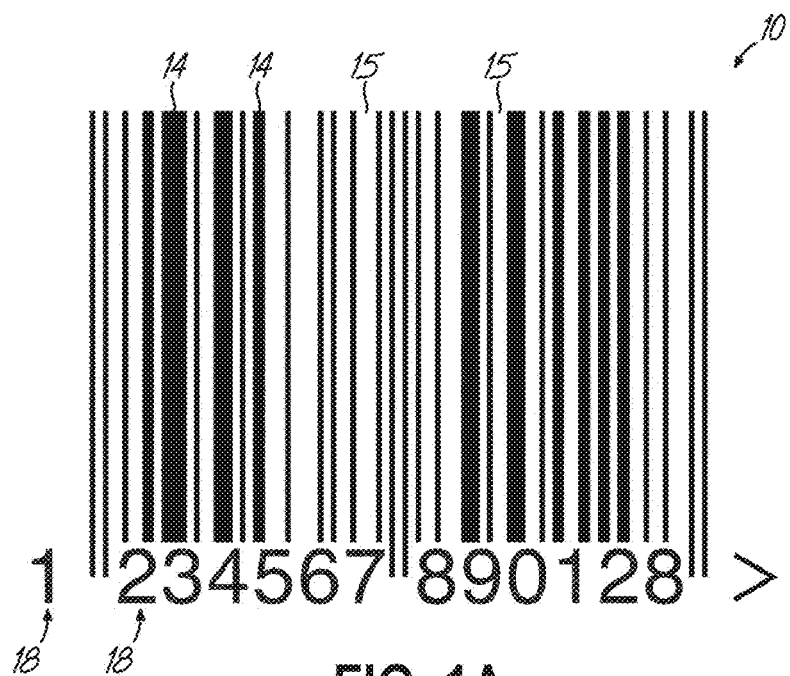
FIG. 1A is a diagrammatic view of an exemplary one-dimensional barcode as known in the art.
Figure 1B:
FIG. 1B is a diagrammatic view of an exemplary two-dimensional barcode as known in the art.

Embodiments disclosed herein are directed to machine-readable optical labels (e.g., one and two-dimensional barcodes), and associated hardware for reading the labels. The labels may encode data using a plurality of absorption bands each configured to absorb light at different wavelengths than the light absorbed by the other absorption bands. Each absorption band may be selectively provided in each of a plurality of modules to define a data storage pattern that stores data independently of data storage patterns defined by the other absorption bands. The absorption bands may be provided by a data storage layer comprising one or more data storage patterns that are deposited on or otherwise operatively coupled to a reflective substrate.

Each absorption band may selectively absorb light in a relatively narrow spectral band. The use of absorption bands having narrow bandwidths may allow a plurality of patterns each having a different absorption band to be used on a single label, e.g., by stacking patterned absorptive thin-film layers on the reflective substrate. The ability to encode multiple data storage patterns on a single label may enable the label to provide a larger data storage capacity than is possible using conventional machine-readable codes.

A reader configured to read the labels may include an imaging device, photodetector, or other optical sensor, and a light source including a plurality of light emitters each having an emission band that falls within the absorption band of one of the data storage patterns. The use of a plurality of narrow-band light emitters may enable the reader to read labels without the need for a spectrometer, spectral filters, a hyperspectral camera, or other expensive equipment. Thus, readers may be relatively simple and low cost, and therefore easy to integrate into a smart phone or similar handheld device. The reader may also include one or more filters that work cooperatively with, or independently of, the light source to decode each data storage pattern of the label.

The spectrally encoded labels disclosed herein may provide high density data encoding in a format having robust readability in a variety of ambient conditions. These features may be advantageous for labeling where data must be stored in an easily readable format having a small footprint, or that can be read from a distance. For example, labels having these features may be particularly suitable for use in labeling cables (e.g., in a datacenter, distribution cabinet, or other congested environment), electrical cables, tubing, parts or other objects in an automated factory, or items in a distribution warehouse or fulfillment center.

FIGS. 2-4 illustrate a cross-sectional view of a portion of a label 20 in accordance with an exemplary embodiment. The label 20 includes a data storage layer 22 comprising a plurality of data storage patterns 24-26 operatively coupled to a substrate 28. The substrate 28 has a reflective surface 29 that faces the data storage layer 22. The reflective surface 29 may produce specular reflection, diffuse reflection, retroreflection, or a combination of two or more of these types of reflection. The portion of the label 20 may also include a plurality of regions each corresponding to a module 30-37 of the label 20.

Substrates having a retroreflective surface may increase the ability of a label reader to decode the label 20 under varying ambient light conditions and reading angles by reflecting a large portion of light received from the direction of the reader back toward the reader. Suitable retroreflecting substrates 28 may include retroreflecting tape having prismatic retroreflectors, embedded sphere-type retroreflectors, or any other suitable type of retroreflecting structure. A retroreflective surface may improve the performance of readers using camera-mounted light sources to illuminate the label 20 as compared to other types of reflecting surfaces. This improved performance may be due to the high returned light efficiency of retroreflectors as compared to diffuse reflecting substrates such as light-colored paper or plastic.

An increased amount of returned light may produce a corresponding increase in the signal-to-noise (SNR) level of the signal received by the label reader as compared to reading a label having a non-retroreflecting surface. This improved SNR may, in turn, improve the ability of the reader to discriminate between the light being used to read the label 20 (which may have characteristics specific to reading a particular data storage pattern, such as spectral content or polarization) and the ambient light being reflected toward the reader by the label 20.

Substrates having retroreflective surfaces may also reduce the dependence of the reader's ability to read labels on the viewing angle of the reader. This reduced dependence on viewing angle may result from more efficient reflection of oblique illumination from labels having retroreflective substrates back to the light source. Retroreflection may also improve reading of machine-readable labels used in machine vision applications. This improved reading of machine-readable labels may be provided by a significant increase in contrast versus background illumination. Contrast may be further improved by acquiring a broad-band image of the label using ambient light or a broad-band light source, and using this image for background correction when obtaining narrowband images of the label.

Each data storage pattern 24-26 of data storage layer 22 may span one or more modules 30-37 of label 20. The portion of each data storage pattern 24-26 in each module 30-37 of label 20 may comprise a layer of material that selectively absorbs light within one of a plurality of narrow spectral bands, or a layer of material that is transparent to light across all of the narrow spectral bands. By way of example, the transmissive regions 24a-26a of data storage patterns 24-26 may transmit light in an operational spectrum, and the absorptive regions 24b-26b of data storage patterns 24-26 may selectively absorb light in one of a plurality of relatively narrow, spectrally independent or otherwise spectrally distinguishable absorption bands within the operational spectrum, e.g., 430 to 470 nm (blue), 525 to 545 nm (green) and 630 to 660 nm (red).

Absorptive regions 24b-26b that selectively absorb red, green, and blue light may be advantageous due to the ability of commonly available camera sensors to differentiate between light in each of these bands. However, it should be understood that the transmission and absorption bands described herein are exemplary only. Thus, transmissive and absorptive region bandwidths are not limited to any particular operational range of wavelengths. For example, the data storage layer 22 may operate in not only the visible light band (e.g., 380-760 nm), but also the near-ultraviolet (e.g., 300-380 nm) and the near-infrared (e.g., 760-2000 nm) bands. Likewise, the data storage layer 22 may include absorption bands having different bandwidths, and may have different spacings between absorption bands than depicted. Absorption bands that selectively absorb narrow portions of the spectral band available to read the label 20 may enable narrower band spacings between absorption bands. The resulting greater number of spectrally distinguishable absorption bands may in turn enable higher data storage densities in the label 20.

Each absorptive region 24b-26b of data storage patterns 24-26 may be configured to provide an absorption band, e.g., by including one or more absorptive materials in the layer, such as a dye or pigment. Dyes used to define absorption bands may include isotropic dyes, dichroic dyes, or combinations of isotropic or dichroic dyes. Absorption bands may also be defined using a plurality of layers having thicknesses and dielectric properties configured to cause constructive or destructive interference of light at certain wavelengths. In any case, because each additional spectrally distinguishable absorption band adds an additional bit of information storage per module 30-37, in a binary data system, the data capacity per module 30-37 may be doubled by each additional absorption band available to define a data storage pattern.

By way of example, each module of a label using six absorption bands in a binary coding system may have a capacity of $2^6=64$ unique codes. Increasing the number of absorption bands to eight results in a four-fold increase in capacity to $2^8=256$ codes. Thus, a 3×3 two-dimensional code using six or eight absorption bands could store $1.8 \times 10^{18}$ or $4.7 \times 10^{21}$ unique codes, respectively. Using ternary coding could further expand the capacity of a 3×3 two-dimensional code using eight absorption bands to $2.2 \times 10^{34}$ unique codes. Labels 20 having absorption bands that are spectrally independent may be read with minimal color crosstalk, which may simplify decoding and minimize read errors as compared to labels having absorption bands that overlap.

Incident light illuminating the label 20 may be represented by arrows 44-46, and reflected light being returned from the label 20 may be represented by arrows 50-61. The incident light 44 in FIG. 2 may be light having one emission band (e.g., blue light), the incident light 45 in FIG. 3 may be light having another emission band (e.g., green light), and the incident light 46 in FIG. 4 may be light having yet another emission band (e.g., red light).

Referring to FIG. 2, incident light 44 having an emission band that falls within the absorption band of absorptive regions 26b may pass through both the transmissive regions 24a, 25a and absorptive regions 24b, 25b of data storage patterns 24, 25, as well as the transmissive regions 26a of data storage pattern 26. Thus, the modules 30, 32, 34, 36 of label 20 which do not include an absorptive region 26b of data storage pattern 26 may return reflected light 50-53. In contrast, incident light 44 illuminating the modules 31, 33, 35, 37 of label 20 that include an absorptive region 26b of data storage pattern 26 may be at least partially absorbed by the data storage pattern 26. Thus, a reduced amount of incident light 44 may be reflected back from these modules 31, 33, 35, 37 as compared to the modules 30, 32, 34, 36 of label 20 lacking an absorptive region 26b. Accordingly, a reader reading the label 20 using incident light 44 having an emission band that interacts with data storage pattern 26 may decode this portion of the label 20 as storing binary values "10101010", where a "1" represents a module that reflected a sufficient amount of light 44 to exceed a logic level threshold, and a "0" represents a module that did not reflect a sufficient amount of light 44 to exceed the logic level threshold.

Referring to FIG. 3, incident light 45 having an emission band that falls within the absorption band of absorptive regions 25b may pass through both the transmissive regions 24a, 26a and the absorptive regions 24b, 26b of data storage patterns 24, 26 (except when the light 45 is absorbed before it reaches an absorptive region 26b of data storage pattern 26), as well as the transmissive regions 25a of data storage pattern 25. Thus, the modules 30, 31, 34, 35 of label 20 that do not include an absorptive region 25b of data storage pattern 25 may return reflected light 54-57. In contrast, incident light 45 illuminating modules 32, 33, 36, 37 of label 20 that include an absorptive region 25b of data storage pattern 25 may be at least partially absorbed by the data storage pattern 25. Thus, a reduced amount of light 45 may be reflected back from these modules 32, 33, 36, 37 as compared to the other modules 30, 31, 34, 35 of label 20 that lack an absorption region 25b. Accordingly, a label reader reading the label 20 using incident light 45 having an emission band that interacts with data storage pattern 25 may decode this portion of label 20 as storing binary values "11001100".

Referring to FIG. 4, incident light 46 having an emission band that falls within the absorption band of absorptive regions 24b may pass through both the transmissive regions 25a, 26a and absorptive regions 25b, 26b of data storage patterns 25, 26 (except when the light 46 is absorbed before it reaches the absorptive regions 25b, 26b of either of these data storage patterns 25, 26), as well as the transmissive regions 24a of data storage pattern 24. Thus, the modules 30-33 of label 20 which do not include an absorptive region 24b of data storage pattern 24 may return reflected light 58-61. In contrast, incident light 46 illuminating the modules 34-37 of label 20 that include an absorptive region 24b of data storage pattern 24 may be at least partially absorbed by the data storage pattern 24. Thus, a reduced amount of light 45 may be reflected back from these modules 34-37 as compared to the other modules 30-33 of label 20. Accordingly, a reader reading the label 20 using incident light 46 may decode this portion of label 20 as storing binary values "11110000".

FIGS. 5-7 illustrate a cross-sectional view of a portion of a label 80 in accordance with another exemplary embodiment. The label 80 includes a data storage layer 82 comprising a plurality of absorptive regions 24b-26b selectively and sequentially deposited on the reflective surface 29 of substrate 28. That is, the data storage layer 82 of label 80 may be fabricated by selectively depositing the absorptive regions 24b-26b on the substrate 28 without the transmissive regions 24a-26a depicted in FIGS. 2-4. This type of label 80 may be formed, for example, through sequential selective deposition of absorptive regions on the substrate 28, e.g., by sequentially printing patterns of absorptive regions 24b-26b on the substrate 28. For example, absorptive regions 26b may be selectively deposited on the substrate, followed by absorptive regions 25b and absorptive regions 24b. This may result in certain modules having no absorptive regions, while other modules have one or more absorptive regions vertically stacked on the substrate 28.

Label 80 may be read in a similar manner as described above with respect to FIGS. 2-4. For example, as depicted by FIG. 5, incident light 44 illuminating module 30 of label 80 may be reflected directly off the reflective surface 29 of substrate 28. Incident light 44 illuminating other modules 32, 34, 36 of label 80 may pass through one or more absorptive regions 24b-25b that do not absorb light in the spectral range occupied by incident light 44 before being reflected off the reflective surface 29 of substrate 28. In contrast, at least a portion of the incident light 44 illuminating modules 31, 33, 35, 37 with absorptive regions 26b may be absorbed by those regions. Accordingly, the binary values decoded by a reader reading label 80 using incident light 44 may be the same ("10101010") as those decoded for label 20 in FIG. 2. The binary values decoded by a reader reading the label 80 in FIGS. 6 and 7 may likewise be the same as for reading the label 20 in FIGS. 3 and 4. Thus, the data storage patterns 24-26 may include respective absorptive regions 24b-26b that are not in the same horizontal plane or otherwise horizontally aligned.

Figure 10:
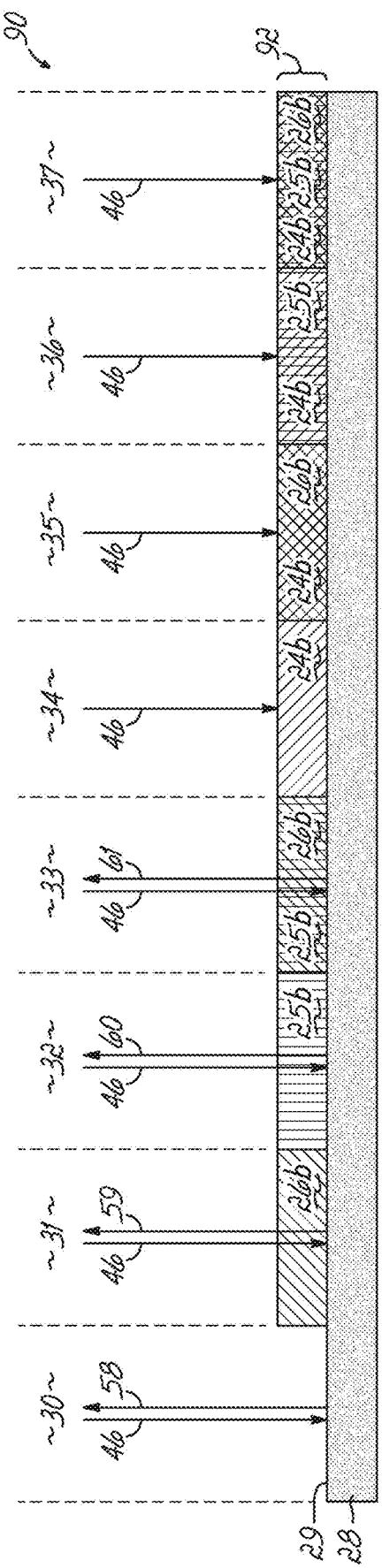

FIGS. 8-10 illustrate a cross-sectional view of a portion of a label 90 in accordance with yet another exemplary embodiment. The label 90 includes a data storage layer 92 in which the absorptive regions 24b-26b have been integrated into a single thin film. That is, each of the data storage patterns 24-26 comprising data storage layer 92 have been integrated into a single layer of material having optical absorption properties that vary dependent on position. This may be accomplished, for example, by selectively depositing material containing different combinations of absorptive materials depending on the absorption bands present at a particular location of the label 90. Each absorption band of the data storage layer 92 may be patterned independently of the other absorption bands by controlling which absorption materials (as indicated by the different hatching patterns) are in the data storage layer 92 at each module 30-37 of label 90. Multiple barcode patterns each provided by a different absorption band may thereby be provided by a data storage layer 92 consisting of a single thin-film.

It should be understood that embodiments are not limited to the exemplary data storage layers depicted by FIGS. 2-10. Rather, any data storage layer configured to store data as a plurality of patterns each defined by a different absorption band may be used. Each pattern may be defined by its own discrete layer. However, processes that generate films which provide absorption bands but that incur interlayer mixing may also be used so long as the spectral and optical properties of each absorption band are preserved. That is, multiple overlaid machine-readable patterns each based on a different spectrally distinguishable absorption band may be provided using multiple layers or a single layer. By way of example, an integrated absorption layer may be configured to provide multiple absorption bands having different patterns by selectively including one or more absorptive materials in the layer in dependence on the lateral position of the portion of the layer in question.

Each spectrally distinct pattern of the data storage layer may be defined by lamination of preexisting films, deposition of a new film, or selective mixing of absorptive materials into a transparent carrier that is deposited on the substrate 28. In any case, each absorption band may be selectively included in or excluded from each module of the barcode. If preexisting films are used, patterning may be established by mechanical removal of regions of the film, material removal by laser ablation, or selective color deactivation through photobleaching, for example. If films are being deposited on the substrate 28, the deposition may occur from a liquid via mechanical or inkjet application, or the deposition may occur from a solid via a LaserJet process. The resulting label modules can be any suitable shape, such as rectangles or bands in the case of one dimensional barcodes, or squares, rectangles, triangles, or hexagons in the case of two-dimensional barcodes.

Figure 11:
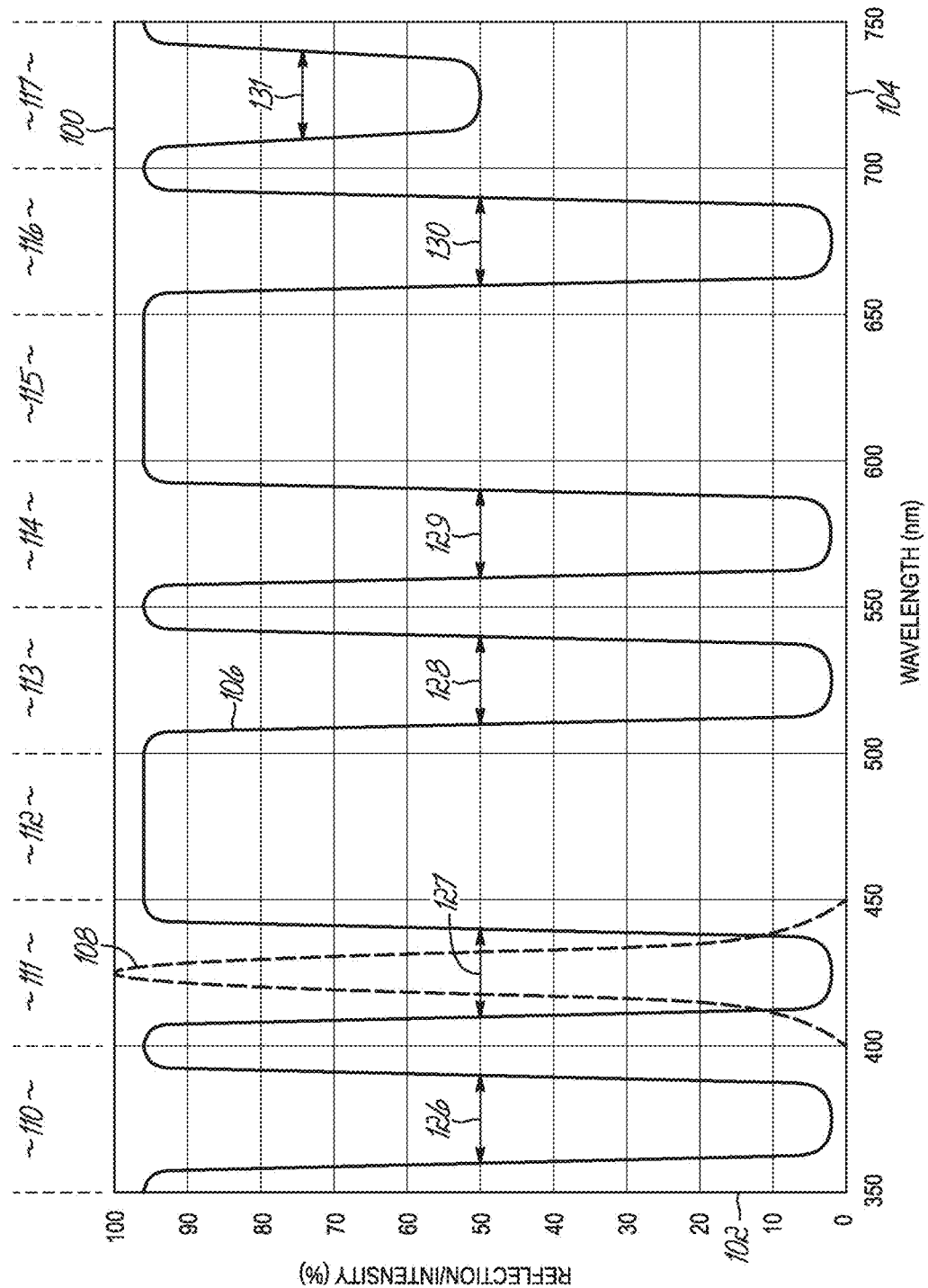
FIG. 11 is a graphical view of intensity verses wavelength for an emission band of light, and reflectance verses wavelength for a module of a label including a plurality of absorption bands.

FIG. 11 depicts a graph 100 having a vertical axis 102 corresponding to a percentage of the incident light reflected back to the reader, and a horizontal axis 104 corresponding to a wavelength of the incident light. Exemplary plot 106 depicts reflectance verses wavelength for an exemplary module of a label. Exemplary plot 108 depicts an emission band of a monochromatic light that may be used to read data stored in a data storage pattern of the label. The module includes a plurality of exemplary spectral bands 110-117, e.g., one for each absorption band available to define a data storage pattern of the label. Thus, each spectral band 110-117 may be associated with a data storage pattern that can be read using light having an emission band that falls within that spectral band. The presence or absence of these absorption bands in the module may determine the reflectance verses wavelength of the module.

The exemplary spectral bands 110-117 are centered on about 375, 425, 475, 525, 575, 625, 675, and 725 nm, and each spectral band 110-117 is about 50 nm wide. As indicated by the plot 106 of reflectance verses wavelength, the module in question includes absorption bands 126-131 in the spectral bands 110, 111, 113, 114, 116, 117 centered on 375, 425, 525, 575, 675, and 725 nm. The module does not include absorption bands in the spectral bands 112, 115 centered on 475 and 625 nm. Thus, a significant amount (e.g., >90%) of the incident light having a wavelength falling into one of these spectral bands 112, 115 may be reflected by the module. Low attenuation of reflected light in a spectral band of a module may indicate a predetermined logic state for the module in that spectral band, e.g., a digital value of "1".

Absorption bands in each module may be configured to absorb a predetermined amount of light having a wavelength falling within the absorption band, e.g., >90%, ≈50%, <10%, etc. Absorption bands having a number of discrete attenuation levels may allow each spectral band to store information as digital data having two or more logic states, with each logic state corresponding to one of the attenuation levels. Discrete attenuation levels may be achieved by controlling a thickness of the absorptive region providing the absorption band, the amount of absorptive material (e.g., dye) in the absorptive region, or a combination of the thickness of and amount of absorptive material in the absorptive region.

Each of the exemplary absorption bands 126-131 has a half-power bandwidth of about 30 nm. Thus, reflected light having a wavelength 15 nm from the center wavelength of an absorption band may be attenuated by about 50% as compared to reflected light having a wavelength that is at the center of the absorption band. Because reflected light passes through the absorptive region both before and after it is reflected by the substrate 28, the absorptive region may be configured to absorb about half the amount of light needed to achieve the desired attenuation level of the reflected light in that module.

Figure 12:
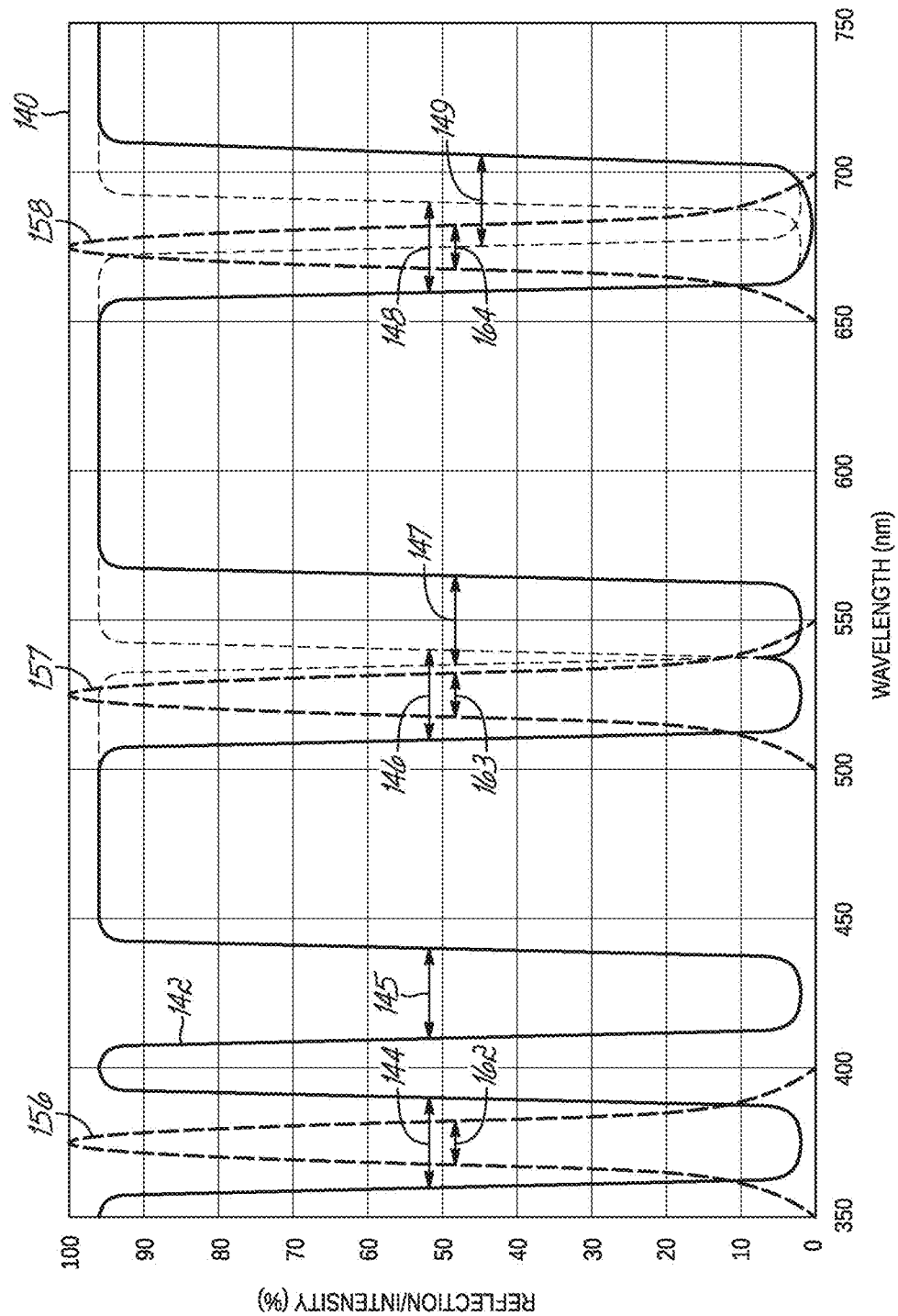
FIG. 12 is a graphical view of intensity verses wavelength for a plurality of emission bands of light, and reflectance verses wavelength for a module including a plurality of absorption bands having different spacings.

Each of the absorption bands 126-131 depicted by FIG. 11 may be considered spectrally independent of each other. Spectrally independent absorption bands may refer to absorption bands having center wavelengths separated from each other by a distance sufficient to prevent overlap between the absorption bands. By way of example, FIG. 12 depicts a graph 140 including an exemplary plot 142 of reflectance verses wavelength for a module of a label having a plurality of absorption bands 144-149, and exemplary plots 156-158 of relative intensity verses wavelength for a plurality of emission bands 162-164 for light that may be used to illuminate the label.

The exemplary absorption bands 144-149 are centered on about 375, 425, 525, 550, 675, and 690 nm, and each of the absorption bands 144-149 has a half-power bandwidth of about 30 nm. The exemplary emission bands 162-164 are centered on about 375, 525, and 675 nm, and each emission band has a half-power bandwidth of about 15 nm.

The absorption bands 124, 125 centered on 375 nm and 425 nm may be considered spectrally independent for the reasons described above for the absorption bands 126-131 depicted in FIG. 11. Thus, the absorption of light having the emission band 156 centered on 375 nm is not affected by the adjacent absorption band 145. That is, the amount of light having the emission band 156 centered on 375 nm reflected by the module is determined solely by the amount of light absorbed by the absorption band 144 centered on 375 nm.

In contrast, the absorption bands 146, 147 centered on 525 and 550 nm overlap in the spectral region between about 530 and 545 nm. Thus, there may be some color crosstalk between these absorption bands, and the bands may be considered as not being spectrally independent. However, the emission band 157 centered on 525 nm may be largely outside the absorption band 147 centered on 550 nm. Due to the limited interaction between the absorption band 147 and the light having the emission band 157 centered on 525 nm, it may still be possible to determine the attenuation caused by the absorption band 146 centered on 525 nm with sufficient accuracy to decode the logic level encoded by that absorption band 146. That is, it may be possible to read data stored in a spectral band centered on 525 nm (i.e., the absorption band 146) despite that fact that of a portion of the light being used to read that spectral band is being absorbed by the adjacent absorption band 147 centered on 550 nm. Hence, although the absorption bands 146, 147 centered on 525 nm and 550 nm may not be considered spectrally independent, they may be considered spectrally distinguishable. Thus, spectrally distinguishable in this disclosure refers to two absorption bands that spectrally differ sufficiently to allow a reader (e.g., reader 244 discussed below) to determine the presence or absence of each band independently of the presence or absence of the other band.

The absorption bands 148, 149 centered on 675 and 690 nm overlap between about 670 and 695 nm. As a result, the half-power wavelength on the short-wavelength side absorption band 149 is about the same as the center wavelength of the emission band 158, i.e., about 675 nm. Thus, the absorption band 149 centered on 690 nm may be expected to absorb about half of the light incident on the module having the emission band 158 centered on 675 nm. Using light having the emission band 158 centered on 675 nm to read data stored in a spectral band centered on 675 nm could therefore produce false readings depending on the number of discrete attenuation levels used to encode the data and the presence or absence of adjacent absorption bands. In cases where there are adjacent absorption bands to both the left and right of the absorption band 148 centered on 675 nm (e.g., absorption bands centered on 660 and 690 nm), the ability to read data stored in the absorption band 148 correctly could be impaired.

For example, in cases where data is encoded using two discrete attenuation levels (e.g., the logic level is determined based on whether the reflected light in the emission band is above or below a threshold level of 50%), it may only be possible to positively detect the status (e.g., presence or absence) of an absorption band when there is no more than one absorption band adjacent to the absorption band being read. Under this scenario, for random data in which absorption bands are present in a spectral band of a module 50% of the time, it might not be possible to positively detect whether an absorption band is present or absent in the band being read 25% of the time. These "blind" readings would always indicate the presence of the absorption band in the spectral band being read due to the presence of adjacent absorption bands on both sides of the band being read.

Because these blind readings would be incorrect 50% of the time (e.g., incorrectly detect the presence of an absorption band in the spectral band centered on 675 nm when the absorption band is not actually present), modules having absorption bands that overlap by 50% may be expected to produce an absorption band reading error rate of about 12.5% in systems using two discrete attenuation levels to encode data. Thus, the ability to read labels that store data using absorption bands (i.e., whether the absorption bands are spectrally distinguishable) may depend on the number, bandwidth, and spacing of the absorption bands, the bandwidth of the emission bands used to read the label, the number of discrete attenuation levels used to encode data, how accurately absorption and emission bands are aligned, and the signal to noise ratio of the light received by the reader. Additional considerations may include error coding used to encode the data stored on the label and the ability of the reader to distinguish between different wavelengths of the reflected light received from the label.

Figure 13:
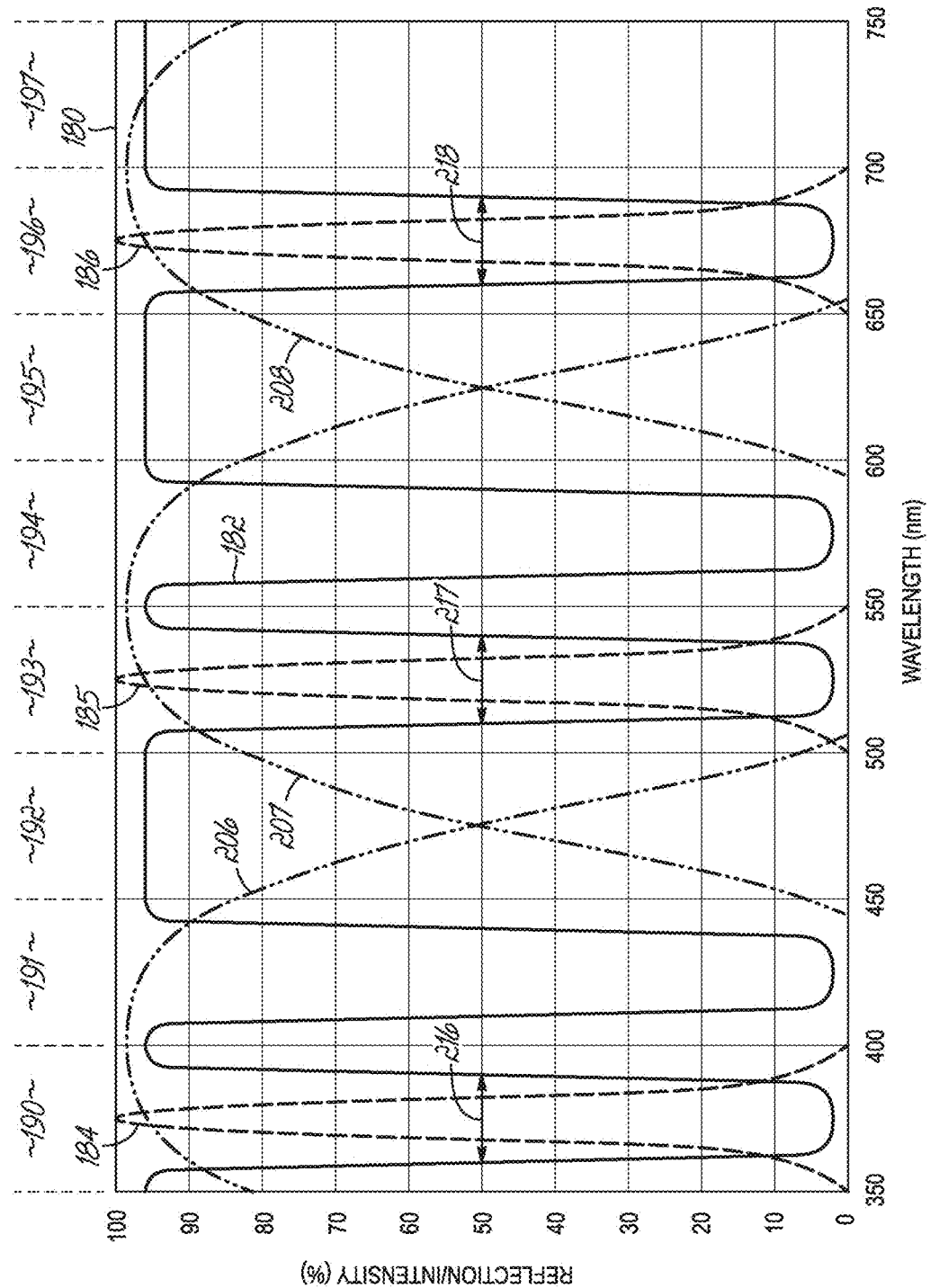
FIG. 13 is a graphical view of intensity verses wavelength for a plurality of emission bands of light, reflectance verses wavelength for a module of a label including a plurality of absorption bands, and sensitivity verses wavelength for a reader reading data encoded by a set of absorption bands.

FIG. 13 depicts a graph 180 including a plot 182 of reflectance verses wavelength for an exemplary module, plots 184-186 of emission bands for exemplary monochromatic lights that may be used to read data stored in corresponding spectral bands 190-197 of the module, and plots 206-208 of exemplary sensitivity verses wavelength for a label reader.

The plots 206-208 show sensitivity in each of a plurality of different color channels (e.g., three color channels) each covering a different spectral range for a label reader having the ability to distinguish the amount of light being received in each of the color channels. This ability to distinguish the amount of light received in different spectral ranges may be provided, for example, by using a color sensor, such as a red-green-blue (RGB) sensor, to detect light received by the reader. Each color channel covers a different set of spectral bands 190-197. This may provide a capability to separately measure light received in each spectral range, thereby enabling the reader to read multiple spectral bands 190-197 simultaneously. This may allow increased frame rates when using color cameras by synchronizing light sources to output light including three emission bands at a time, with one emission band in each color channel of the camera. Simultaneously illuminating the label with three monochromatic light sources may allow an increase in acquisition speed of up to three times that obtained by only illuminating the label with light in one emission band at a time.

For example, based on a failure to receive a significant amount reflected light from the module in each of the spectral ranges 206-208 while the label is being illuminated with light having the emission bands 184-186 centered on 375, 525, and 675 nm, it may be determined that the corresponding spectral bands 190, 193, 196 of the module include absorption bands 216-218. Accordingly, each of these spectral bands of the module may be decoded as storing a logic level corresponding to the presence of an absorption band, e.g., $bit_{190}=bit_{193}=bit_{196}=0$.

Figure 14:
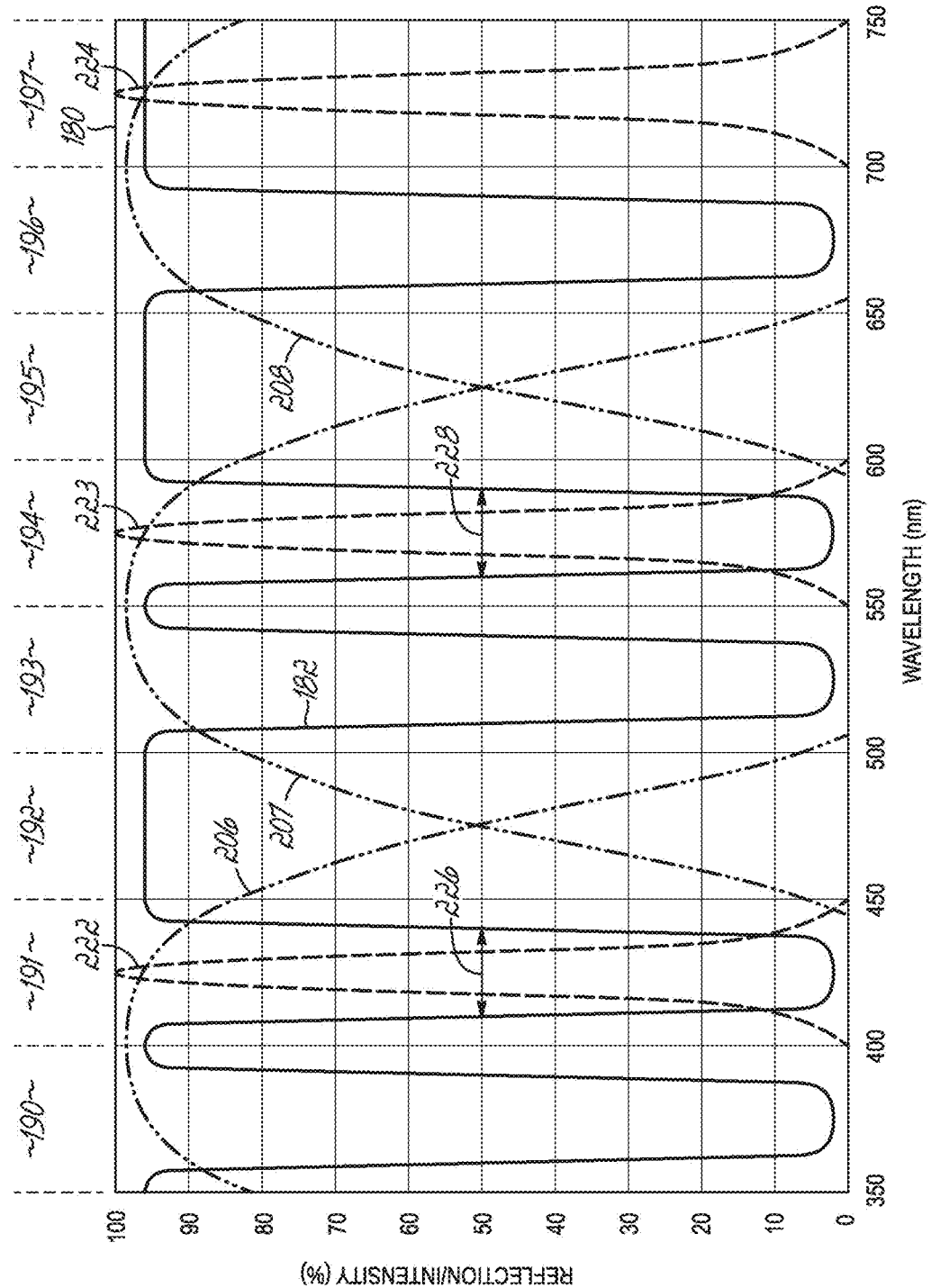
FIG. 14 is a graphical view of the intensity verses wavelength for another plurality of emission bands of light, as well as the reflectance verses wavelength for the module of the label and the sensitivity verses wavelength for the reader of FIG. 13 reading data encoded by another set of absorption bands.

Referring now to FIG. 14, once the previous set of spectral bands 190, 193, 196 have been read, the label may be illuminated with light having emission bands 222-224 centered on another group of spectral bands 191, 194, 197, and another reading taken of the reflected light received from the module. In the depicted example, the reader may fail to receive a significant amount of reflected light from the module in the spectral ranges 206, 207 sensitive to light in the emission bands 222, 223 centered on 425 and 575 nm. However, the reader may detect a significant amount of reflected light in the spectral range 208 sensitive to light in the emission band 224 centered on 725 nm. Based on the both spectral content of the illuminating light, and the color channels in which light is detected by the reader, the reader may determine that the spectral bands 191, 194 of the module include absorption bands 226, 228, and that the spectral band 197 of the module does not include an absorption band. Accordingly, the two spectral bands 191, 194 of the module including absorption bands 226, 228 may be decoded as storing a logic level corresponding to the presence of an absorption band, and the spectral band 197 lacking an absorption band may be decoded as storing a logic level corresponding to the absence of an absorption band, e.g., $bit_{191}=bit_{194}=0$, and $bit_{197}=1$.

Figure 15:
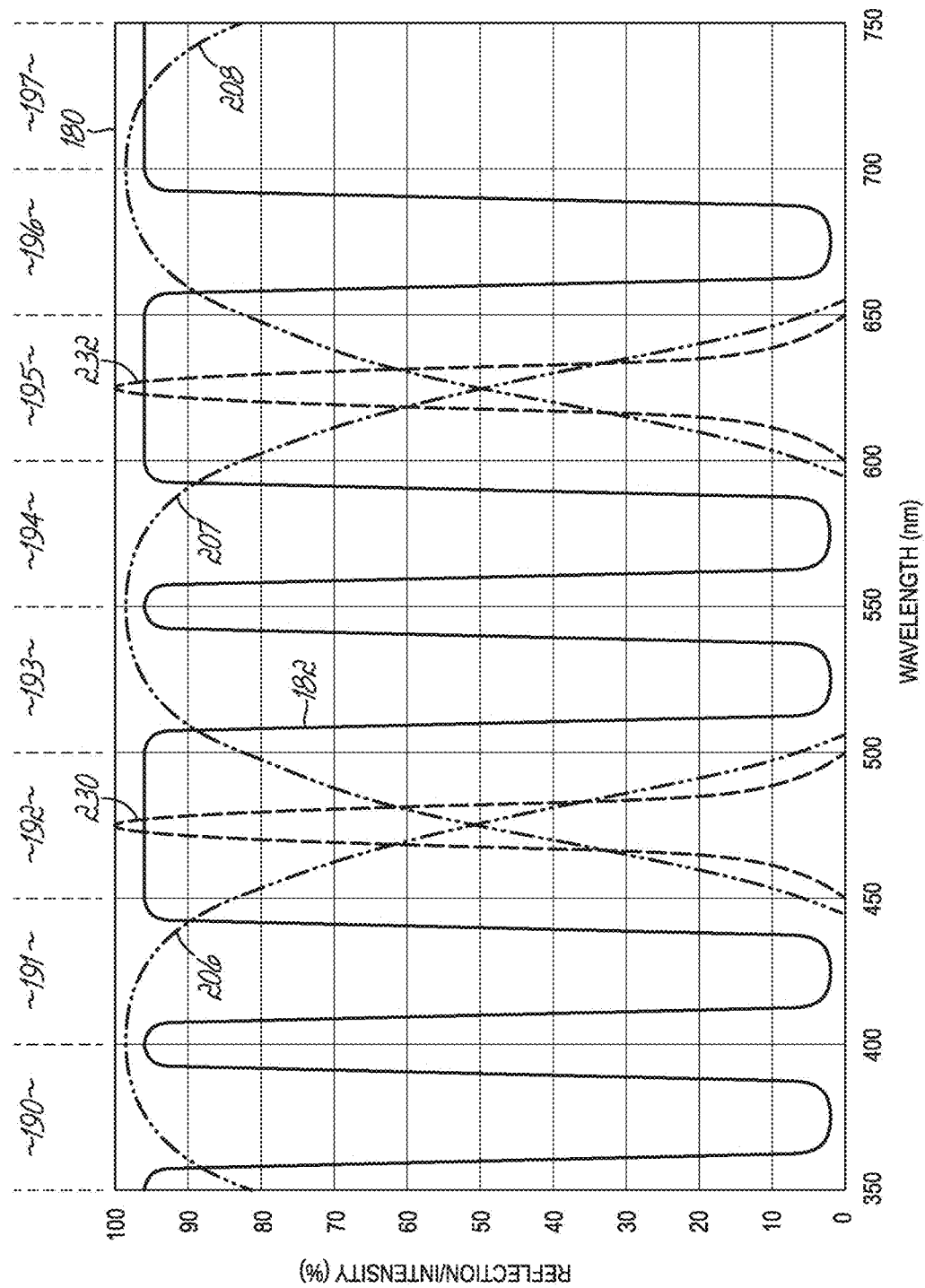
FIG. 15 is a graphical view of the intensity verses wavelength for yet another plurality of emission bands of light, as well as the reflectance verses wavelength for the module of the label and the sensitivity verses wavelength for the reader of FIGS. 13 and 14 reading data encoded by yet another set of absorption bands.

Referring now to FIG. 15, in order to read the remaining set of spectral bands 192, 195, the label may be illuminated with light having emission bands 230, 232 centered on yet another group of spectral bands 192, 195, and another reading taken of the reflected light received from the module. In the depicted example, the reader may receive a significant amount of reflected light from the module in each of the spectral ranges 206, 207, 208. This may be due to the spectral ranges 206, 207 being sensitive to light in the emission band 230 centered on 475 nm, and the spectral ranges 207, 208 being sensitive to light in the emission band 232 centered on 625 nm. Based on both the spectral content of the illuminating light, and the spectral ranges in which light is detected (i.e., spectral ranges 206 and 208), the reader may determine that neither of the spectral bands 192, 195 of the module include an absorption band. Accordingly, the two spectral bands 192, 195 of the module may be decoded as storing a logic level corresponding to the absence of an absorption band, e.g., $bit_{192}=bit_{195}=1$. The data decoded from the exemplary module may then be assembled into an 8-bit sequence "00100101" stored by the module.

Another process that may be used to read labels would be to modulate each monochromatic light source at a different frequency, and use a radio frequency (RF) sensitive (e.g. phase sensitive) camera to capture a sequence of images from which the result of each illumination source could be distinguished. This would allow each data storage pattern to be decoded concurrently, although it may also require specialized camera hardware. The reader may also use a broadband (e.g., white) light source and perform color separation at the sensor of the reader. Using broadband light to illuminate the label could limit the number of absorption bands available for coding depending on the ability of the optical sensor of the reader to distinguish between adjacent absorption bands. Use of broadband illumination could allow decoding of three data storage patterns using an RGB color camera in a smartphone, for example. Optical sensors having a larger number of color channels may of course be used to enable decoding of an increased number of data storage patterns at the reader.

Figure 16:
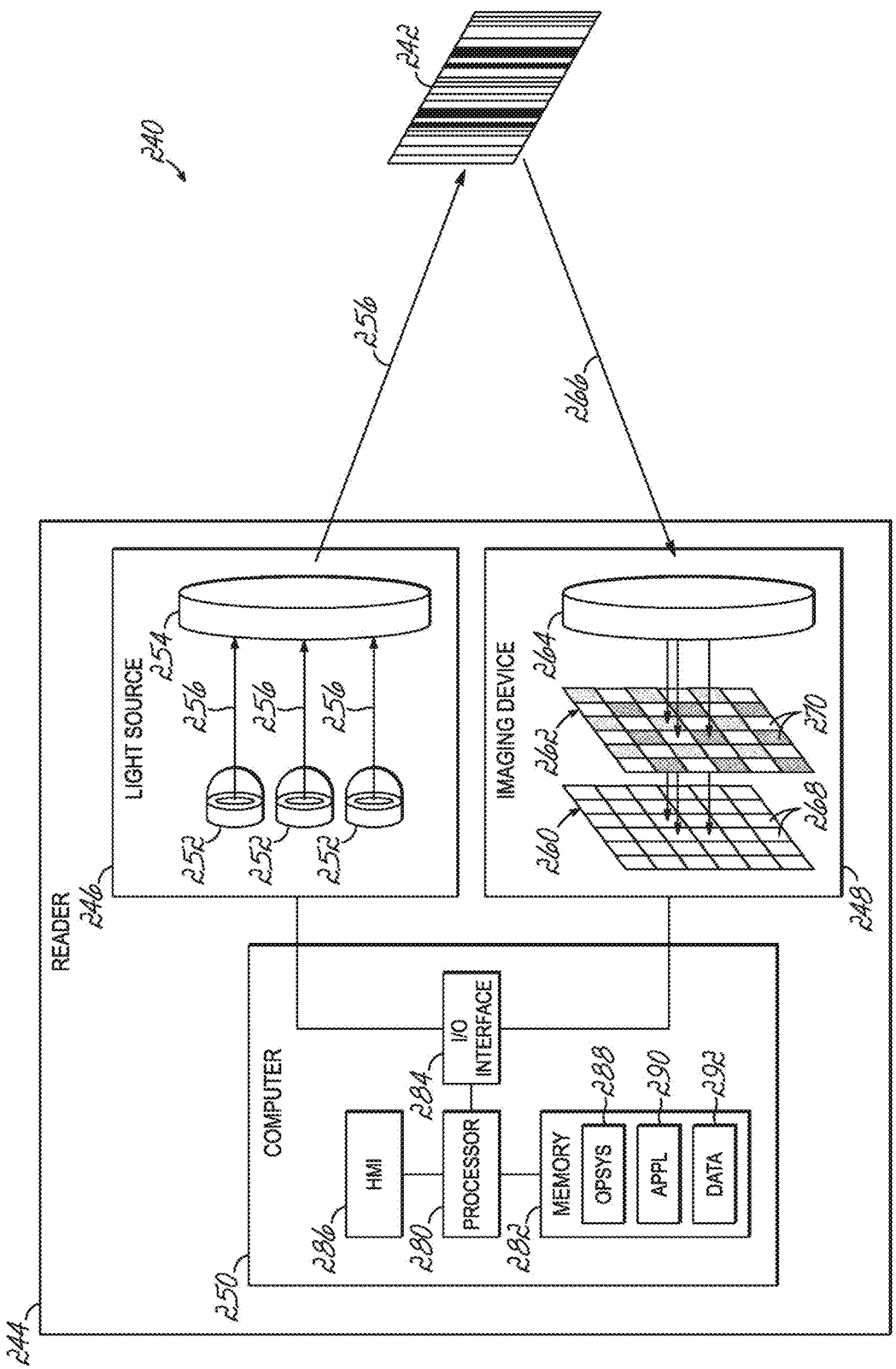
FIG. 16 is a schematic illustration of reader for reading labels.

FIG. 16 depicts an exemplary operating environment 240 including a label 242 and a reader 244. The reader 244 may include a light source 246 and an imaging device 248 each operatively coupled to a computer 250. The light source 246 may be positioned proximate to the imaging device 248 to maximize the amount of light received from labels having a retroreflective substrate. The computer 250 may be configured to control the light source 246 and imaging device 248, and to decode images captured by the imaging device 248. In an alternative embodiment, the reader 244 may rely on ambient light to read the label 242, in which case the light source 246 may be omitted.

The light source 246 may include one or more emitters 252, such as light emitting diodes (LEDs), and a lens 254 or other optical device that directs light 256 emitted by the emitters 252 in a direction the reader 244 is pointed, e.g., toward the label 242. Each emitter 252 may emit light having a broad emission band that covers multiple absorption bands, or a narrow emission band (i.e., a monochromatic emission band) that covers a single absorption band. Monochromatic emitters 252 may be configured to emit light that is spectrally matched to a respective absorption band used to store data in the label 242, i.e., light having an emission band that falls within the respective absorption band. The computer 250 may thereby control the spectral content of light emitted by the light source 246 by selectively activating emitters 252. Each emitter 252 may be independently controlled by the computer 250 to emit light for a period of time during which one or more images of the label 242 are captured by the imaging device 248.

For example, the computer 250 may cause the light source 246 to selectively emit light 256 in one or more of a plurality of narrow emission bands, e.g., blue light, green light, and red light. One or more of the emitters 252 may also comprise a laser that is scanned across the label 242 (e.g., using a rotating prism or reciprocating mirror). Emitters 252 may also be configured to emit light outside the visible spectrum, such as light having wavelengths in the infrared and ultra-violet regions of the electromagnetic spectrum.

The imaging device 248 may include a light sensor 260, a filter 262 or other suitable color separation mechanism (e.g. a dichroic prism or layered structure that separates colors based on wavelength-dependent absorption), and a lens 264 or other optical element (e.g., a mirror) that focuses the received light 266 to form an image on the light sensor 260. The light sensor 260 may be an imaging sensor, such as a charge-coupled device (CCD) or active-pixel sensor (CMOS sensor), that includes a plurality of sensor elements or "pixels" 268 arranged in a two-dimensional array. Each pixel 268 may be configured to convert light 266 incident on the pixel 268 into an electrical signal indicative of an intensity of the light received by that pixel 268. The filter 262 may comprise a plurality of filter elements 270 arranged in a two-dimensional array such that the light 266 received by each pixel 268 first passes through one of the filter elements 270.

Each filter element 270 may comprise an optical filter that selectively transmits light based on its wavelength. That is, each filter element 270 may selectively transmit light in one or more pre-defined spectral ranges, and absorb light outside those spectral ranges. Accordingly, each pixel 268 receiving light 266 that has passed through a filter element 270 may provide a signal indicative of the amount of light 266 in the spectral range selectively transmitted by that filter element 270. The light sensor 260 may thereby provide information to the computer 250 indicative of the spectral content of the light 266 received by the imaging device 248. This information may be used to separate the image formed on the light sensor 260 into images in different color channels.

By way of example, each filter element 270 may selectively pass light in a spectral range corresponding to one of a blue, a green, or a red color as perceived by human vision. The filter elements 270 may be arranged in a mosaic pattern, such as a Bayer pattern, that enables the computer 250 to use signals received from the pixels 268 to estimate the spectral content of the light 266 incident on different portions of the light sensor 260. Other types of sensors 260 may include one or more photo-diodes or other light-sensitive devices configured to measure the intensity of the light 266 as a laser or other narrow beam of light 256 is scanned across the label 242.

The computer 250 may include a processor 280, a memory 282, an input/output (I/O) interface 284, and a Human Machine Interface (HMI) 286. The processor 280 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 282. Memory 282 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 280 may operate under the control of an operating system 288 that resides in memory 282. The operating system 288 may manage computer resources so that computer program code embodied as one or more computer software applications 290 residing in memory 282 can have instructions executed by the processor 280. One or more data structures 292 may also reside in memory 282, and may be used by the processor 280, operating system 288, or application 290 to store or manipulate data.

The I/O interface 284 may provide a machine interface that operatively couples the processor 280 to other devices and systems, such as the light source 246 and imaging device 248. The application 290 may thereby work cooperatively with the other devices and systems by communicating via the I/O interface 284 to provide the various features, functions, applications, processes, or modules comprising embodiments of the reader 244. The application 290 may also have program code that is executed by one or more external resources, or otherwise rely on functions or signals provided by other system or network components external to the computer 250. Indeed, given the nearly endless hardware and software configurations possible, persons having ordinary skill in the art will understand that embodiments may include applications that are located externally to the computer 250, distributed among multiple computers or other external resources, or provided by computing resources (hardware and software) that are provided as a service over a network, such as a cloud computing service.

The HMI 286 may be operatively coupled to the processor 280 of computer 250 to allow a user to interact directly with the reader 244. The HMI 286 may include video or alpha-numeric displays, a touch screen, a speaker, and any other suitable audio and visual indicators capable of providing data to the user. The HMI 286 may also include input devices and controls such as an alphanumeric keyboard, a pointing device, keypads, pushbuttons, control knobs, microphones, etc., capable of accepting commands or input from the user and transmitting the entered input to the processor 280.

The computer 250 may also be operatively coupled to one or more external resources, e.g., via a communication network. External resources may include, but are not limited to, servers, databases, mass storage devices, peripheral devices, cloud-based network services, or any other resource that may be used by the computer 250 to implement features of the reader 244. This may include transmitting data decoded from the label 242 to an external resource, and receiving data from the external resource in response to the transmission.

In operation, the reader 244 may read the label 242 using one or more of a plurality of different processes depending on how the reader 244 and label 242 are configured. The process used to read the label 242 may also depend on the ambient conditions under which the label 242 is being read. For example, the reader 244 may activate the light source 246 to illuminate the label 242 with light having a spectral content configured to be absorbed only by a specific absorption band of the label 242. That is, the light source 246 may be activated to emit monochromatic light spectrally matched to a single absorption band used in the label 242. In this case, the reader 244 may decode the data storage pattern of the label 242 associated with the absorption band in question based on the image formed on sensor without the need for filtering the light 266 reflected by the label 242. Readers that use a reading process which illuminates the label with monochromatic light that matches one absorption band at a time (e.g., sequentially) may use a broad-band monochromatic light sensor 260. Readers 244 configured to read labels 242 by controlling the spectral output of the light source 246 may omit the filter 262, or use a filter 262 having filter elements 270 with spectral bandwidths that cover more than one absorption band used in the label 242.

The reader 244 may also read the label 242 by selectively filtering the reflected light 266 received from the label 242. Selective filtering of the reflected light 266 may be enabled by configuring each pixel 268 of light sensor 260 to only be sensitive to light within a spectral band that is absorbed by absorptive regions used to form one of the data storage patterns of label 242. In this case, the reader 244 may decode multiple data storage patterns simultaneously by illuminating the label 242 with broad-band light, or by relying on ambient light reflected from the label 242. Thus, the reader 244 may be configured to read label 242 by filtering the light 266 received by the sensor 260, in which case the light source 246 may be omitted, or configured to emit only broad-band light.

The reader 244 may also read the label using a combination of narrow-band illumination and filtering of the received light. For example, the reader 244 may selectively activate two or more narrow-band emitters 252 of light source 246, and determine an amount of reflected light 266 received in each of a plurality of color channels of the imaging device 248. As a specific example, consider the discussion above with respect to FIGS. 13-15 and simultaneously illuminating a label with three different emission bands in three different color channels (red-green-blue) to increase acquisition speed. Such a technique may be done in concert with the filtering technique discussed with respect to the imaging device 248 and filter elements 270 to allow even faster decoding of the label. Taking a first image while activating three narrow-band emitters 252 (respectively having first emission bands in red, green, and blue color channels), followed by taking a second image while activating three other narrow-band emitters 252 (respectively having second emission bands in red, green, and blue color channels), may include all of the information needed to decode six spectral bands when filtering techniques are also used.

Figure 17:
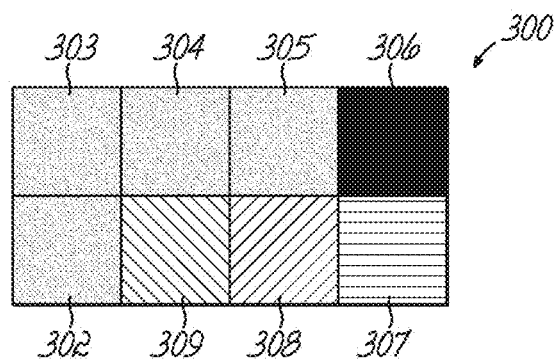
FIGS. 17-20 are diagrammatic views of labels that may be read by the reader of FIG. 16.

FIG. 17 depicts an exemplary label 300 that includes eight modules 302-309 arranged in two rows and four columns. The label 300 may include three absorption bands (e.g., red, green, and blue) that are indicated by the different hatching in each of respective data modules 307-309. An exemplary boarder of label 300 defined by modules 302-306 may provide fiducial marks which enable the extent, pitch, and orientation of the label 300 to be determined from an image of the label 300. The border may also include one or more calibration modules (e.g., modules 302-305) having maximum reflectivity (e.g., 100% reflectivity), and one or more calibration modules (e.g., module 306) having minimum reflectivity (e.g., 0%) to enable the reader to calibrate reflection intensity levels.

The use of three data modules 307-309 and three absorption bands may allow readers to distinguish $2^9=512$ unique barcodes when using binary coding. Digital encoding based on numerical systems other than binary systems may increase the number of unique barcodes. For example, ternary coding using attenuation bands having high absorption (e.g., >90%) and medium absorption (e.g., ≈45% absorption) could expand the number of unique codes to $3^9=19,683$. The presence of calibration modules may facilitate the use of non-binary coding by improving the reader's ability to accurately determine the quantified attenuation level of the absorption bands in each data module 307-309.

Figure 18:
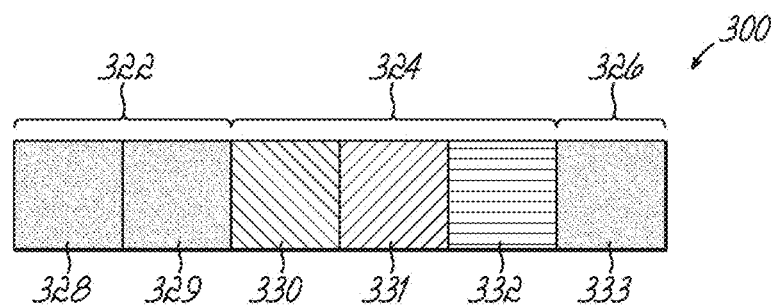

FIG. 18 depicts an exemplary label 320 that includes a header band 322 comprising one or more (e.g., two) modules 328, 329, a body 324 comprising one or more (e.g., three) modules 330-332, and a tail band 326 comprising one or more (e.g., one) module 333. The header and tail bands 322, 326 may include a known configuration of absorption bands that facilitates identification of the bar code 320 in an image captured by the reader. The header and tail bands 322, 326 may also facilitate determination of the spacing of the modules 328-333, and the order in which the modules 328-333 should be read.

The header and tail bands 322, 326 may have known coding and be included in all labels 320 having a data format associated with those header and tail bands 322, 326. The header and tail bands 322, 326 may enable detection logic to look for and identify potentially valid barcodes in an image captured by a reader, such as a smartphone running a label reading application. In the depicted embodiment, the header band 322 has a length that is a multiple of (e.g., twice) the length of each data module 330-332 and the tail band 326. This size difference may facilitate determining the scale of the coding used in label 320, which may be at an unknown and widely varying distance from the reader. The header and tail bands 322, 326 may thereby facilitate decoding of labels 320 having two or more adjacent data modules 330-323 each having the same combination of one or more absorption bands.

Figure 19:
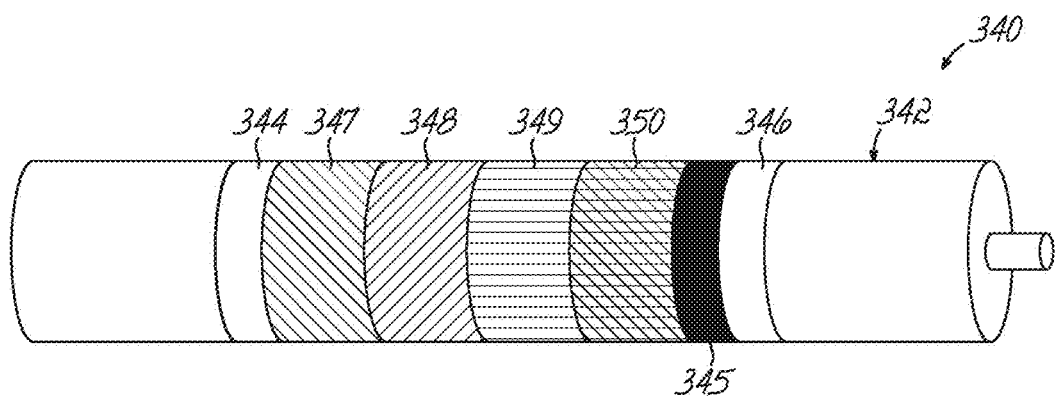

FIG. 19 depicts a label 340 including a one-dimensional axial barcode, which may be suitable for coupling to a cable 342 or other cylindrical object. The label 340 may include one or more (e.g., three) start/stop bands 344-346, one or more (e.g., three) data bands 347-349, and one or more (e.g., one) error check bands 350. The start/stop bands 344-346 may be half the width (e.g., one module wide) of the data and error check bands 347-350 to facilitate determining the band width and barcode directionality unambiguously. The start/stop bands 344-346 may also have known broad-band reflectivity levels, (e.g., 100% and 0%) to facilitate calibration of the reader.

Figure 20:
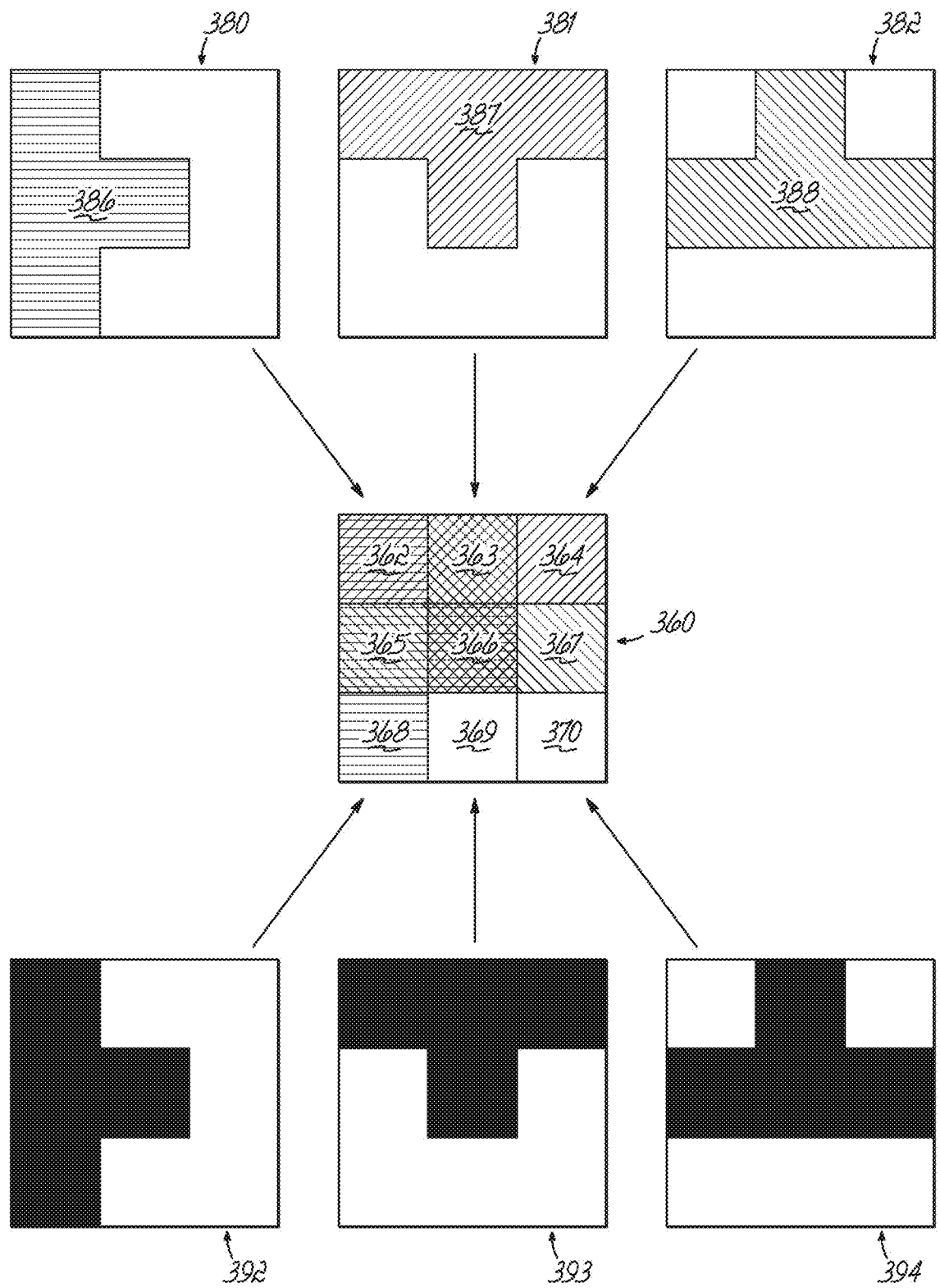

FIG. 20 depicts a label 360 including an exemplary two-dimensional barcode comprising a plurality of modules 362-370 arranged in a number of rows and columns, e.g., nine modules arranged in three rows and three columns. The data storage layer of label 360 may include a plurality of data storage patterns 380-382 each comprising an absorptive region 386-388. Each absorption region 386-388 may have an absorption band that is spectrally independent of the absorption bands of the other data storage patterns 380-382. Reading the label 360 using a color channel corresponding to a spectral band that is largely absorbed by a respective data storage pattern 380-382 may generate a respective monochromatic image 392-394 in the reading device.

Reading the label 360 using a color channel may comprise illuminating the label 360 using light having a spectral content corresponding to the color channel being read, filtering light received from the label 360, or by a combination of selective illumination of the label 360 and filtering of the light received from the label 360. For example, each monochromatic image 392-394 of the label 360 may be obtained from the pixels of a color image sensor corresponding to the color channel in question, e.g., prior to the output of the sensor being processed by a demosaicing algorithm. Each monochromatic image 392-394 may also be obtained by illuminating the label 360 with a sufficient amount of monochromatic or other narrow-band light to overcome ambient light conditions, e.g., by synchronizing image capture with a narrow band stroboscopic light source.

Each data storage pattern 380-382 may selectively alter the reflective properties of the modules 362-370 of label 360 in accordance with a pattern indicative of the data stored by that data storage pattern 380-382. The absorptive region 386-388 of each data storage pattern 380-382 may absorb incident light in its respective absorption band in the modules 362-370 of label 360 that include that absorptive region 386-388. Conversely, each data storage pattern 380-382 may not absorb a significant amount of the light incident on the modules 362-370 of label 360 that are not covered by its respective absorptive region 386-388. Thus, the light reflected by each module 362-370 of label 360 may be characterized by a relatively low amount of light in the absorption bands of absorptive regions 380-382 present in the module.

By way of example, modules 369 and 370 of label 360 do not include any absorptive regions, as indicated by the lack of hatching. Thus, these modules may reflect substantially all incident light back toward the reader. Relatively high amounts of reflected light from a module at wavelengths within a respective absorption band may be indicative of a predetermined logic level (e.g., logic level=1) being stored by the respective data storage pattern 380-382 at the location of the module.

Modules 364, 367, and 368 of label 360 each have a single absorptive region. These modules may therefore reflect a relatively low amount of incident light having a wavelength which is within the absorption band of the absorptive region in that module. Modules 362, 363, and 365 each have two absorptive regions, and consequently may reflect only incident light which is outside the absorption band of both those regions. Finally, module 366 includes three absorptive regions, and thus may reflect a relatively low amount of light in each of the absorption bands utilized by the data storage layer of label 360.

As can be seen from the monochromatic images 392-394, and by reading from left to right and top to bottom, image 392 may be decoded as carrying binary values "011001011", image 393 may be decoded as carrying binary values "000101111", and image 394 may be decoded as carrying binary values "101000111". Thus, label 360 may store 27 bits of data in nine modules 362-370 using a data storage layer including three spectrally distinguishable data storage patterns 380-382.

The machine-readable codes provided by the exemplary data storage patterns described herein may be considered as simple codes in the sense that each module of the data storage pattern comprises a fixed-sized region of the label, and encodes a single digital logic value. However, it should be understood that other coding schemes may be used. Patterns used for barcoding may follow a variety of approaches, including higher density analogs of one-dimensional barcodes, two-dimensional barcodes, cylindrical bands, or simple multi-panel labels. Patterns may include in-situ features to establish orientation, module size, and the levels of reflectivity corresponding to different digital numeric values, e.g., nominally 100% and 0% reflectivity portions of the label. Additional features may be incorporated for encoding in-situ error checking such as a "check digit" or "binary parity bit". For example, a sum check digit may be used wherein a predetermined barcode module encodes the last digit in a base 10 sum of all preceding values in the barcode. Additional features which may improve readability of labels may also be used, such as leaving unpatterned (i.e., highly reflective) areas between adjacent modules, interleaving of data, and error correction codes. Advantageously, many barcode encoding approaches that are currently used can be adapted to decoding barcodes defined using multiple data storage patterns as described herein.

Although the above disclosure describes embodiments of systems and methods in great detail with respect to storing data in and reading data from labels including data storage patterns having different absorption bands, the scope of the disclosure is not so limited. Thus, those skilled in the art will appreciate that other modifications and variations can be made without departing from the spirit or scope of the disclosure. Since modifications, combinations, sub-combinations, and variations of the disclosed embodiments incorporating the spirit and substance of the disclosure may occur to persons skilled in the art, the disclosure should be construed to include everything within the scope of the appended claims and their equivalents.

What is claimed is:

1. A system for storing data, comprising:
a label including a substrate having a reflective surface and a data storage layer operatively coupled to the reflective surface of the substrate, the data storage layer defining a first pattern having a first absorption band and a second pattern having a second absorption band, the first pattern encoding a first portion of the data, the second pattern encoding a second portion of the data, and the first absorption band being spectrally distinguishable from the second absorption band; and
a reader including an imaging device configured to receive reflected light from the label, the imaging device having a first color channel that includes the first absorption band and excludes the second absorption band, and a second color channel that excludes the first absorption band and includes the second color channel, the reader being configured to:
cause the imaging device to capture a first image of the label in the first color channel, and a second image of the label in the second color channel,
decode the first portion of the data from the first image, and
decode the second portion of the data from the second image.

2. The system of claim 1, wherein the first pattern and the second pattern each comprise a plurality of modules, the first portion of the data is encoded as an attenuation level of reflected light reflected by each module in the first absorption band, and the second portion of the data is encoded as an attenuation level of the reflected light reflected by each module in the second absorption band.

3. The system of claim 2, wherein each pattern is configured so that the attenuation level of the reflected light reflected by each module in each of the first and second absorption bands is one of a plurality of discrete attenuation levels.

4. The system of claim 1, wherein the reflective surface of the substrate is a retroreflective surface.

5. The system of claim 1, wherein:
the reader includes a light source configured to provide incident light to the label.

6. The system of claim 5, wherein:
the light source is configured to emit a first light in a first emission band that falls within the first absorption band and a second light in a second emission band that falls within the second absorption band, and
the reader is configured to:
cause the light source to emit the first light during a first period of time and the second light during a second period of time, and cause the imaging device to capture the first image of the label during the first period of time and the second image of the label during the second period of time.

7. The system of claim 6, wherein:
the data storage layer further defines a third pattern having a third absorption band that is spectrally distinguishable from the first absorption band and the second absorption band and that encodes a third portion of the data,
the light source is further configured to emit a third light in a third emission band that falls within the third absorption band,
the imaging device includes a first color channel that includes the first absorption band and the second absorption band and excludes the third absorption band, and a second color channel that includes the third absorption band and excludes the first absorption band and the second absorption band,
the first image is captured in the first color channel, and
the reader is further configured to:
cause the light source to emit the third light during the first period of time,
cause the imaging device to capture a third image of the label in the second color channel during the first period of time, and
decode the third portion of the data from the third image.

8. The system of claim 1, wherein the first color channel is one of a red channel, a green channel, and a blue channel, and the second color channel is another of the red channel, the green channel, and the blue channel.

9. The system of claim 1, wherein the data storage layer includes a first thin film having one or more first absorptive regions that absorb light in the first absorption band and define the first pattern, and a second thin film having one or more second absorptive regions that absorb light in the second absorption band and define the second pattern.

10. A method of reading data from a label, comprising:
capturing a first image of the label in a first color channel including a first absorption band and excluding a second absorption band;
capturing a second image of the label in a second color channel excluding the first absorption band and including the second absorption band;
decoding a first portion of the data from the first image; and
decoding a second portion of the data from the second image,
wherein capturing the first image in the first color channel and the second image in the second color channel comprises:
filtering a first portion of reflected light received from the label through a first filter having a first passband that includes the first absorption band and excludes the second absorption band;
filtering a second portion of the reflected light received from the label through a second filter having a second passband that excludes the first absorption band and includes the second absorption band;
capturing the first image using the first portion of the reflected light filtered by the first filter; and
capturing the second image using the second portion of the reflected light filtered by the second filter.

11. The method of claim 10, wherein capturing the first image in the first color channel and the second image in the second color channel comprises:
illuminating the label with a first light having a first emission band that falls within the first absorption band during a first period of time;
illuminating the label with a second light having a second emission band that falls within the second absorption band during a second period of time;
capturing the first image during the first period of time; and
capturing the second image during the second period of time.

12. The method of claim 10, wherein the first color channel is one of a red channel, a green channel, and a blue channel, and the second color channel is another of the red channel, the green channel, and the blue channel.

13. The method of claim 1, further comprising:
capturing a third image of the label in a third color channel including a third absorption band and excluding the first absorption band and the second absorption band; and
decoding a third portion of the data from the third image,
wherein the first passband excludes the third absorption band, the second passband includes the third absorption band, and capturing the first image of the label in the first color channel, the second image of the label in the second color channel, and the third image of the label in the third color channel comprises:
illuminating the label with a first light having a first emission band that falls within the first absorption band during a first period of time,
illuminating the label with a second light having a second emission band that falls within the second absorption band during a second period of time,
illuminating the label with a third light having a third emission band that falls within the third absorption band during the first period of time,
capturing the first image during the first period of time,
capturing the second image during the second period of time, and
capturing the third image using the second portion of the reflected light filtered by the second filter during the first period of time.

14. The method of claim 10, wherein the label includes a plurality of modules, and decoding the first portion of the data and the second portion of the data comprises, for each module:
determining, based on the first image, a first attenuation level of reflected light reflected in the first absorption band;
determining, based on the second image, a second attenuation level of reflected light in the second absorption band;
assigning a first logic level to a first data bit associated with the module based on the first attenuation level; and
assigning a second logic level to a second data bit associated with the module based on the second attenuation level.

15. The method of claim 10, further comprising:
capturing a third image of the label in a broadband channel including the first absorption band and the second absorption band; and
performing background correction on at least one of the first image and the second image using the third image.

16. A computer program product for reading data from a label, comprising:
a non-transitory computer-readable storage medium; and program code stored on the non-transitory computer-readable storage medium that, when executed by one or more processors, causes the one or more processors to:
  capture a first image of the label in a first color channel including a first absorption band and excluding a second absorption band;
  capture a second image of the label in a second color channel excluding the first absorption band and including the second absorption band;
  decode a first portion of the data from the first image; and
  decode a second portion of the data from the second image,
wherein capturing the first image in the first color channel and the second image in the second color channel comprises:
  filtering a first portion of reflected light received from the label through a first filter having a first passband that includes the first absorption band and excludes the second absorption band;
  filtering a second portion of the reflected light received from the label through a second filter having a second passband that excludes the first absorption band and includes the second absorption band;
  capturing the first image using the first portion of the reflected light filtered by the first filter; and
  capturing the second image using the second portion of the reflected light filtered by the second filter.

* * * * *